United States Patent
Suzuki

(10) Patent No.: US 9,507,122 B2
(45) Date of Patent: Nov. 29, 2016

(54) IMAGING LENS

(71) Applicant: KANTATSU CO., LTD., Yaita-shi, Tochigi (JP)

(72) Inventor: Hisanori Suzuki, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 45 days.

(21) Appl. No.: 14/301,482

(22) Filed: Jun. 11, 2014

(65) Prior Publication Data

US 2015/0043092 A1 Feb. 12, 2015

(30) Foreign Application Priority Data

Aug. 9, 2013 (JP) ................................ 2013-166821

(51) Int. Cl.
*G02B 9/34* (2006.01)
*G02B 13/00* (2006.01)

(52) U.S. Cl.
CPC ............... *G02B 9/34* (2013.01); *G02B 13/004* (2013.01)

(58) Field of Classification Search
CPC .............................. B41M 5/1555; G02B 9/34
USPC ....... 359/644, 650, 660, 715, 747, 766, 772, 359/773
See application file for complete search history.

(56) References Cited

U.S. PATENT DOCUMENTS

| | | | |
|---|---|---|---|
| 2010/0165483 A1* | 7/2010 | Tang .................. | G02B 15/173 359/715 |
| 2013/0003194 A1* | 1/2013 | Suzuki ................ | G02B 13/004 359/715 |
| 2013/0258500 A1* | 10/2013 | Suzuki .................. | G02B 13/18 359/714 |
| 2014/0347515 A1* | 11/2014 | Iba ....................... | G02B 13/004 348/222.1 |

FOREIGN PATENT DOCUMENTS

| | | | | |
|---|---|---|---|---|
| JP | 2013-15587 A | | 1/2013 | |
| JP | 2013088513 | * | 5/2013 | ........... G02B 13/004 |
| WO | WO 2013054509 A1 | * | 4/2013 | ........... G02B 13/004 |

* cited by examiner

*Primary Examiner* — Scott J Sugarman
*Assistant Examiner* — Vipin Patel
(74) *Attorney, Agent, or Firm* — Oliff PLC

(57) ABSTRACT

Designed for a solid-state image sensor, it includes, in order from an object side to an image side: a first positive lens having a convex object-side surface; a second negative lens having a concave image-side surface; a third positive meniscus lens having a convex image-side surface; and a fourth negative lens having concave object-side and image-side surfaces near an optical axis. A first diffraction optical surface is formed on one lens surface of the first to third lenses, and a second one is formed on the fourth lens object-side surface. The imaging lens satisfies a conditional expression below, $$0.0 < r6/r7 < 0.1,$$

where r6 denotes the curvature radius of the third lens image-side surface, and r7 denotes that of the fourth lens object-side surface.

8 Claims, 18 Drawing Sheets

IMAGING LENS

The present application is based on and claims priority of Japanese patent application No. 2013-166821 filed on Aug. 9, 2013, the entire contents of which are hereby incorporated by reference.

BACKGROUND OF THE INVENTION

Field of the Invention

The present invention relates to imaging lenses built in camera modules using solid-state image sensors such as relatively compact low-profile CCD sensors and CMOS sensors which are mounted in mobile terminals such as mobile phones and smart phones or PDAs (Personal Digital Assistants).

Description of the Related Art

In recent years, there has been a trend that the cameras built in devices such as mobile terminals (mobile phones, smart phones, etc.) and PDAs provide high resolution to cope with an increase in the number of pixels. In addition, for increased convenience and better appearance of these devices, the demand for smaller low-profile camera modules mounted therein is growing. At the same time, imaging lenses built in camera modules are also strongly expected to provide high resolution, smallness (compactness), thinness (low-profileness) and high brightness (namely a small F-value) and also offer a wide field of view to capture an image of an object over a wide range.

In order to meet the recent trend toward an increase in the number of pixels, many types of imaging lenses composed of four or five constituent lenses (elements) have been proposed as imaging lenses built in the above-mentioned devices. However, an imaging lens composed of four constituent lenses can meet the demand for compactness because of the small number of constituent lenses but cannot provide a sufficient function to correct aberrations to achieve higher resolution. Also, an imaging lens composed of five constituent lenses can correct aberrations more easily and is more advantageous in providing higher resolution and higher performance but has difficulty in meeting the recent demand for compactness and a low-profile design.

In order to address the above problem, the present applicant has proposed an imaging lens described in JP-A-2013-15587 (Patent Document 1). The imaging lens includes four constituent lenses and has a diffraction optical surface on one lens surface to achieve high resolution and high performance without an increase in the number of constituent lenses.

Specifically, in Patent Document 1, the present applicant discloses an imaging lens which includes, from an object side, a biconvex first lens, a biconcave second lens, a meniscus third lens with positive refractive power having a concave surface on the object side, and a biconcave fourth lens, in which all the lens surfaces are aspheric, a diffraction optical surface with a chromatic dispersion function is formed on one of the object-side surface of the first lens to the object-side surface of the third lens, and all the constituent lenses are made of plastic material.

The imaging lens described in Patent Document 1 is a compact imaging lens which provides brightness with an F-value of about 2.4 and corrects chromatic aberrations and other aberrations properly. According to Patent Document 1, since the second lens has negative refractive power and is made of high-dispersion material and the diffraction optical surface is formed in an optimum place in the lens system, the imaging lens corrects axial and off-axial chromatic aberrations more properly and delivers higher imaging performance than the conventional imaging lenses composed of four constituent lenses. However, in order to meet the recent growing demand for imaging lenses which provide a wide field of view, high brightness, and compactness and high imaging performance, further improvement is necessary. In other words, the following problems must be addressed: one problem is that plastic material options are limited, and another problem is that high-dispersion materials generally have difficulty in correcting residual chromatic aberrations due to their partial dispersion characteristics as expressed by a quadratic curve. Whereas thanks to the diffraction optical surface formed on the optimum lens surface, chromatic aberrations can be corrected more properly than with a conventional refractive lens. However, it is difficult to improve the higher ability to correct particularly chromatic aberrations of magnification related to the above problem of the characteristics of the material and deliver higher imaging performance.

SUMMARY OF THE INVENTION

The present invention has been made in view of the above problems and an object thereof is to provide a compact imaging lens which provides a relatively wide field of view and high brightness, corrects various aberrations properly and has a higher ability to correct chromatic aberrations than conventional imaging lenses with a diffraction optical surface and delivers high imaging performance.

Here, a "compact" imaging lens means an imaging lens in which total track length TTL is about 5.0 mm or less and the ratio of TTL to the length 2ih of the diagonal of the effective image plane of the image sensor, namely TTL/2ih is 1.0 or less. This means that when the total track length is shorter than the size of the image sensor, it is easier to make a low-profile camera module, thereby contributing to the increasingly low-profile design of mobile terminals. "Total track length" denotes the distance on an optical axis from the object-side surface of an optical element located nearest to the object to the image plane in an optical system without an IR cut filter, etc.

According to one aspect of the present invention, there is provided an imaging lens for a solid-state image sensor in which elements are arranged in the following order from an object side to an image side: a first lens with positive refractive power having a convex surface on the object side; a second lens with negative refractive power having a concave surface on the image side; a third lens with positive refractive power as a meniscus lens having a convex surface on the image side; and a fourth lens with negative refractive power having a concave surface on each of the object side and the image side near the optical axis. In the imaging lens, a first diffraction optical surface is formed on one of the lens surfaces of the first to third lenses, and a second diffraction optical surface is formed on the object-side surface of the fourth lens. The imaging lens satisfies a conditional expression (1) below:

$$0.0 < r6/r7 < 0.1 \tag{1}$$

where r6 denotes the curvature radius of the image-side surface of the third lens, and r7 denotes the curvature radius of the object-side surface of the fourth lens.

Thus, this imaging lens is composed of a lens group of the first, second, and third lenses having composite positive refractive power and the fourth lens with negative refractive power so that aberrations are corrected properly and the imaging lens is a telephoto type which has a short total track length. A diffraction optical surface is formed by a relief which generates an optical path difference defined by an optical path difference function. While the Abbe number of an optical material at e-ray is usually from 25 to 80, the Abbe number of the diffraction optical surface at e-ray is about −3.3 (reverse sign), implying almost one-digit higher dispersion. In addition to the so-called "achromatic" effect brought by a combination of a positive lens of low-dispersion material and a negative lens of high-dispersion material which is generally employed by lens systems, the formation of a diffraction optical surface with an appropriate optical path difference function on an appropriate lens surface enables more effective "achromatization", or chromatic aberration correction.

In the present invention, basically the first lens is a lens with positive refractive power having a convex surface on the object side, in which the object-side surface has strong refractive power so that the first lens has relatively strong positive refractive power to contribute to the compactness of the imaging lens. The second lens is a lens with negative refractive power having a concave surface on the image side, which corrects chromatic aberrations, astigmatism, and coma aberrations properly. The third lens is a meniscus lens with positive refractive power having a convex surface on the image side, which corrects various aberrations properly and suppresses increase in total track length. The fourth lens is a lens with negative refractive power having a concave surface on each of the object-side and image-side surfaces near the optical axis, making it easy to ensure an adequate back focus. The third and fourth lenses each have adequate refractive power so that the total track length is shortened and various off-axial aberrations are corrected properly. An imaging lens thus configured can achieve both proper aberration correction and compactness easily, so it can deliver sufficiently high imaging performance as demanded. The present invention addresses the problem of chromatic aberrations which could not be corrected in the above conventional configuration and achieves higher imaging performance which meets the recent demand. Next, the features of the present invention will be explained.

First, in the present invention, the first diffraction optical surface is formed on one of the surfaces of the first to third lenses on which the diffraction efficiency is optimum. Therefore, chromatic aberrations on the first to third lenses are corrected by the two elements, namely the second lens with negative refractive power and the first diffraction optical surface, in a well-balanced manner. In particular, the first diffraction optical surface effectively corrects chromatic aberrations at low image height and permits better correction of chromatic aberrations than conventional refractive lenses composed of four constituent lenses.

Here, the optimum surface for the formation of the first diffraction optical surface refers to a surface near the aperture stop, namely a lens surface where the diameter of a luminous flux is relatively large and the difference between the incidence and exit angles of light rays is small. If a lens surface meets these conditions, it can increase the diffraction efficiency, prevent flare attributable to secondary or tertiary light and correct chromatic aberrations effectively. In the imaging lens according to the present invention, the first diffraction optical surface is formed on one of the surfaces of the first to third lenses which meets the above conditions.

Furthermore, in the present invention, the second diffraction optical surface is formed on the object-side surface of the fourth lens. The present applicant conducted an experiment and has demonstrated that residual chromatic aberrations due to partial dispersion characteristics dependent on the characteristics of material, which cannot be corrected even by the chromatic aberration correction function of the second lens with negative refractive power and the chromatic aberration correction function of the first diffraction optical surface, can be effectively corrected by the second diffraction optical surface formed on the object-side surface of the fourth lens. Therefore, this second diffraction optical surface is very important in the sense that it further suppresses chromatic aberrations in the overall optical system of the imaging lens effectively. In addition, in order to minimize the influence of flare attributable to secondary or tertiary light, the object-side surface of the fourth lens is very gradual, forming a uniformly changing aspheric surface without a pole-change point or inflection point. Since the formation of the second diffraction optical surface on this aspheric surface enables light rays emitted from the third lens to enter the fourth lens at a small angle, it prevents deterioration in diffraction efficiency and reduces flare, permitting chromatic aberrations to be corrected properly. The second diffraction optical surface is effective in correcting chromatic aberrations, particularly at high image height. Therefore, the imaging lens according to the present invention can correct chromatic aberrations from low image height to high image height in a very well-balanced manner using the three elements, namely the second lens with negative refractive power, the first diffraction optical surface, and the second diffraction optical surface. A "pole-change point" here means a point on an aspheric surface at which a tangential plane intersects the optical axis perpendicularly, and an "inflection point" means a point on an aspheric surface at which the sign of the curvature radius is reversed.

The conditional expression (1) indicates a condition to improve the diffraction efficiency of the second diffraction optical surface and correct chromatic aberrations properly. If the value is above the upper limit of the conditional expression (1), the incidence angle at which light rays emitted from the third lens enter the second diffraction optical surface would be large, resulting in a decline in diffraction efficiency. On the other hand, if the value is below the lower limit of the conditional expression (1), the incidence angle at which light rays emitted from the third lens enter the second diffraction optical surface would also be large, resulting in a decline in diffraction efficiency. When the value is within the range defined by the conditional expression (1), the angle of light rays incident on the fourth lens is decreased, which improves the diffraction efficiency and suppresses flare.

More preferably, the imaging lens satisfies a conditional expression (1a) below:

$$0.0 < r6/r7 < 0.05 \tag{1a}$$

In the present invention, the aperture stop may be located on the object side of the first lens, or between the first and second lenses, or between the second and third lenses so that the diffraction efficiency of the first diffraction optical surface is increased. As is commonly known, in the case of an imaging lens for use in a solid-state image sensor, it is necessary to keep the angle of light rays incident on the image plane small (control the angle to let it be as perpendicular to the imaging plane as possible) in order to provide sufficient brightness in the image peripheral area and prevent color drift in the image peripheral area. When the aperture stop is closer to the object, the exit pupil is remoter from the image plane and thus the angle of light rays incident on the image plane is smaller. Therefore, preferably the aperture stop is as close to the object as possible and more preferably, it is located on the object side of the first lens.

In the imaging lens according to the present invention, preferably the first lens is a biconvex lens. When the first lens is a biconvex lens, its positive refractive power can be distributed to the object-side surface and the image-side surface, which reduces spherical aberrations, prevents the sensitivity to lens surface manufacturing tolerance from increasing and makes it easy to shorten the total track length.

In the imaging lens according to the present invention, it is preferable that the second lens be a biconcave lens in which the curvature radius of the object-side surface is larger than the curvature radius of the image-side surface. As a consequence, chromatic aberrations of magnification and various off-axial aberrations can be corrected effectively.

In the imaging lens according to the present invention, it is preferable that an aspheric shape with a pole-change point in a position off the optical axis be formed on the image-side surface of the fourth lens. Such aspheric shape is effective mainly in correcting distortion and field curvature and makes it easy to control the angle of light rays incident on the image sensor.

Preferably, the imaging lens according to the present invention satisfies a conditional expression (2) below:

$$-0.1 < r8/r7 < 0.0 \qquad (2)$$

where r7 denotes the curvature radius of the object-side surface of the fourth lens, and r8 denotes the curvature radius of the image-side surface of the fourth lens.

The conditional expression (2) indicates a condition to improve the diffraction efficiency of the second diffraction optical surface and ensure an adequate back focus. If the value is above the upper limit of the conditional expression (2), the negative refractive power of the fourth lens would be too strong, resulting in a long back focus and making it difficult to make the total track length short. On the other hand, if the value is below the lower limit of the conditional expression (2), the negative refractive power of the fourth lens would be too weak, making it difficult to ensure an adequate back focus. When the relation between the curvature radius of the object-side surface of the fourth lens and that of its image-side surface is within the range defined by the conditional expression (2), an adequate back focus is ensured without impairing the second diffraction optical surface's function to correct chromatic aberrations properly.

More preferably, the imaging lens satisfies a conditional expression (2a) below:

$$-0.05 < r8/r7 < 0.0. \qquad (2a)$$

Preferably, the imaging lens according to the present invention satisfies conditional expressions (3) and (4) below:

$$-0.07 < f/(v2 \cdot f2) + f/(vd13 \cdot fd13) < -0.02 \qquad (3)$$

$$0.0 < f/fd13 < 0.1 \qquad (4)$$

where f denotes the focal length of the overall optical system of the imaging lens, f2 denotes the focal length of the second lens, fd13 denotes the focal length of the first diffraction optical surface, v2 denotes the Abbe number of the second lens at d-ray, and vd13 denotes the Abbe number of the first diffraction optical surface at d-ray.

The conditional expression (3) defines an adequate range for the relation between the refractive power of the second lens and the paraxial refractive power of the first diffraction optical surface, and indicates a condition to enable the first diffraction optical surface to correct chromatic aberrations properly. If the value is above the upper limit of the conditional expression (3), the refractive power of the second lens and the refractive power of the first diffraction optical surface, which are designed to correct chromatic aberrations, would not be enough, making it difficult to correct chromatic aberrations. On the other hand, if the value is below the lower limit of the conditional expression (3), the refractive power of the second lens and the refractive power of the first diffraction optical surface would be too large, again making it difficult for the first diffraction optical surface to correct chromatic aberrations.

The conditional expression (4) defines an adequate range for the paraxial refractive power of the first diffraction optical surface and indicates, in combination with the conditional expression (3), a condition to correct chromatic aberrations properly. If the value is above the upper limit of the conditional expression (4), axial chromatic aberrations would be excessively corrected (chromatic aberration at short wavelengths increases in the positive direction with respect to chromatic aberration at the reference wavelength), resulting in an imbalance between axial chromatic aberrations and chromatic aberrations of magnification and making it difficult to correct chromatic aberrations properly. On the other hand, if the value is below the lower limit of the conditional expression (4), the burden on the second lens to correct axial chromatic aberrations would be too large, again making it difficult to correct chromatic aberrations properly.

More preferably, the imaging lens satisfies a conditional expression (4a) below:

$$0.0 < f/fd13 < 0.05. \qquad (4a)$$

Preferably, the imaging lens according to the present invention satisfies conditional expressions (5) and (6) below:

$$-0.07 < f/(v2 \cdot f2) + f/(vd4 \cdot fd4) < -0.02 \qquad (5)$$

$$0.0 < f/fd4 < 0.1 \qquad (6)$$

where f denotes the focal length of the overall optical system of the imaging lens, f2 denotes the focal length of the second lens, fd4 denotes the focal length of the second diffraction optical surface, v2 denotes the Abbe number of the second lens at d-ray, and vd4 denotes the Abbe number of the second diffraction optical surface at d-ray.

The conditional expression (5) defines an adequate range for the relation between the refractive power of the second lens and the paraxial refractive power of the second diffraction optical surface, and indicates a condition to enable the second diffraction optical surface to correct chromatic aberrations properly. If the value is above the upper limit of the conditional expression (5), the refractive power of the second lens and the refractive power of the second diffraction optical surface, which are designed to correct chromatic aberrations, would not be enough, making it difficult to correct chromatic aberrations. On the other hand, if the value is below the lower limit of the conditional expression (5), the refractive power of the second lens and the refractive power of the second diffraction optical surface would be too large, again making it difficult to correct chromatic aberrations.

The conditional expression (6) defines an adequate range for the paraxial refractive power of the second diffraction optical surface and indicates, in combination with the conditional expression (5), a condition to correct chromatic aberrations properly. If the value is above the upper limit of the conditional expression (6), axial chromatic aberrations would be excessively corrected (chromatic aberration at short wavelengths increases in the positive direction with respect to chromatic aberration at the reference wavelength), resulting in an imbalance between axial chromatic aberrations and chromatic aberrations of magnification and making it difficult to correct chromatic aberrations properly. On the other hand, if the value is below the lower limit of the conditional expression (6), the burden on the second lens to correct axial chromatic aberrations would be too large, again making it difficult to correct chromatic aberrations properly.

More preferably, the imaging lens satisfies a conditional expression (6a) below:

$$0.0 < f/fd4 < 0.05. \tag{6a}$$

Preferably, the imaging lens according to the present invention satisfies a conditional expression (7) below:

$$0.6 < TTL/2ih < 0.9 \tag{7}$$

where TTL denotes the distance on the optical axis from the object-side surface of an optical element located nearest to the object to the image plane without the filter, etc., and ih denotes the maximum image height.

The conditional expression (7) defines an adequate range for the relation between total track length and maximum image height. If the value is above the upper limit of the conditional expression (7), total track length would be too long to achieve such compactness as demanded recently. On the other hand, if the value is below the lower limit of the conditional expression (7), total track length would be too short to correct various aberrations and the space for the four constituent lenses would be too small. If the four constituent lenses are arranged in such a small space, various problems related to the manufacturing process would be likely to arise: for example, it might be difficult for the lenses to have a manufacturable thickness, it might be difficult to make adequate aspheric shapes, and manufacturing error sensitivity might be high.

Preferably, the imaging lens according to the present invention satisfies a conditional expression (8) below:

$$0.5 < f1/f < 0.8 \tag{8}$$

where f denotes the focal length of the overall optical system of the imaging lens, and f1 denotes the focal length of the first lens.

The conditional expression (8) defines an adequate range for the ratio of the focal length of the first lens to the focal length of the overall optical system of the imaging lens, and indicates a condition to shorten the total track length and suppress various aberrations. If the value is above the upper limit of the conditional expression (8), the positive refractive power of the first lens relative to the refractive power of the overall optical system of the imaging lens would be too weak to make the total track length short though it would be easy to decrease the lens manufacturing error sensitivity, thus making it difficult to achieve compactness and low-profileness. On the other hand, if the value is below the lower limit of the conditional expression (8), the positive refractive power of the first lens relative to the refractive power of the overall optical system of the imaging lens would be too strong, making it difficult to correct aberrations and undesirably leading to higher lens manufacturing error sensitivity.

Preferably, the imaging lens according to the present invention satisfies a conditional expression (9) below:

$$-1.50 < f2/f < -0.85 \tag{9}$$

where f denotes the focal length of the overall optical system of the imaging lens, and f2 denotes the focal length of the second lens.

The conditional expression (9) defines an adequate range for the negative refractive power of the second lens relative to the refractive power of the overall optical system of the imaging lens, and indicates a condition to shorten the total track length of the imaging lens and correct chromatic aberrations properly. If the value is above the upper limit of the conditional expression (9), the negative refractive power of the second lens would be too strong to shorten the total track length and chromatic aberrations would be excessively corrected (chromatic aberration at short wavelengths increases in the positive direction with respect to chromatic aberration at the reference wavelength), making it difficult to deliver high imaging performance. On the other hand, if the value is below the lower limit of the conditional expression (9), the negative refractive power of the second lens would be too weak to correct chromatic aberrations properly (chromatic aberration at short wavelengths increases in the negative direction with respect to chromatic aberration at the reference wavelength), though it would be easy to shorten the total track length. If a diffraction optical surface is used to compensate for insufficient correction of chromatic aberrations, the number of orbicular zones must be increased, undesirably making the manufacturing process more difficult.

Preferably, the imaging lens according to the present invention satisfies a conditional expression (10) below:

$$0.3 < f3/f < 0.6 \tag{10}$$

where f denotes the focal length of the overall optical system of the imaging lens, and f3 denotes the focal length of the third lens.

The conditional expression (10) defines an adequate range for the positive refractive power of the third lens relative to the refractive power of the overall optical system of the imaging lens, and indicates a condition to shorten the total track length of the imaging lens and correct spherical aberrations and coma aberrations properly. If the value is above the upper limit of the conditional expression (10), the positive refractive power of the third lens would be too weak to shorten the total track length. On the other hand, if the value is below the lower limit of the conditional expression (10), the positive refractive power of the third lens would be too strong, undesirably leading to increase in spherical aberrations and coma aberrations, though it would be easy to shorten the total track length.

Preferably, the imaging lens according to the present invention satisfies a conditional expression (11) below:

$$-0.6 < f4/f < -0.3 \tag{11}$$

where f denotes the focal length of the overall optical system of the imaging lens, and f4 denotes the focal length of the fourth lens.

The conditional expression (11) defines an adequate range for the negative refractive power of the fourth lens relative to the refractive power of the overall optical system of the imaging lens and indicates a condition to achieve compactness, ensure an adequate back focus, and correct aberrations properly. If the value is above the upper limit of the conditional expression (11), the negative refractive power of the fourth lens would be too strong to shorten the total track length. On the other hand, if the value is below the lower limit of the conditional expression (11), the negative refractive power of the fourth lens would be too weak, making it difficult to ensure an adequate back focus and correct distortion and field curvature.

In the imaging lens according to the present invention, it is desirable that the first to fourth lenses be all made of plastic material and all the lens surfaces be aspheric. When plastic material is used for all the constituent lenses, the manufacturing process is easier and the imaging lens can be mass-produced at low cost. If a glass lens with anomalous dispersion characteristics is adopted to correct chromatic aberrations, the imaging performance will be improved but it will be difficult to meet the market need for low cost. In the present invention, high-dispersion polycarbonate plastic material is used for the second lens, and low-dispersion cycloolefin plastic material is used for the first, third, and fourth lenses. In addition, when all the lens surfaces have adequate aspheric shapes, it is easier to suppress various aberrations and the chromatic aberration correction functions of the first and second diffraction optical surfaces are thus more effective.

In the imaging lens according to the present invention, it is desirable that the number of orbicular zones formed on the first and second diffraction optical surfaces be smaller than 10. If the number of orbicular zones is larger than 10, diffuse reflection from the orbicular zone edges would increase, resulting in contrast deterioration and a failure to deliver high imaging performance.

According to the present invention, it is possible to provide a compact imaging lens which provides a relatively wide field of view and high brightness, corrects aberrations properly, particularly chromatic aberrations more properly than ever, and delivers high imaging performance.

DETAILED DESCRIPTION OF THE PREFERRED EMBODIMENTS

Hereinafter, the preferred embodiment of the present invention will be described in detail referring to the accompanying drawings. FIGS. 1, 4, 7, 10, 13, and 16 are schematic views showing the general configurations of the imaging lenses in Examples 1 to 6 according to this embodiment, respectively. Since all these examples have the same basic lens configuration, the general configuration of an imaging lens according to this embodiment is explained below referring to the schematic view of Example 1.

Figure 1:
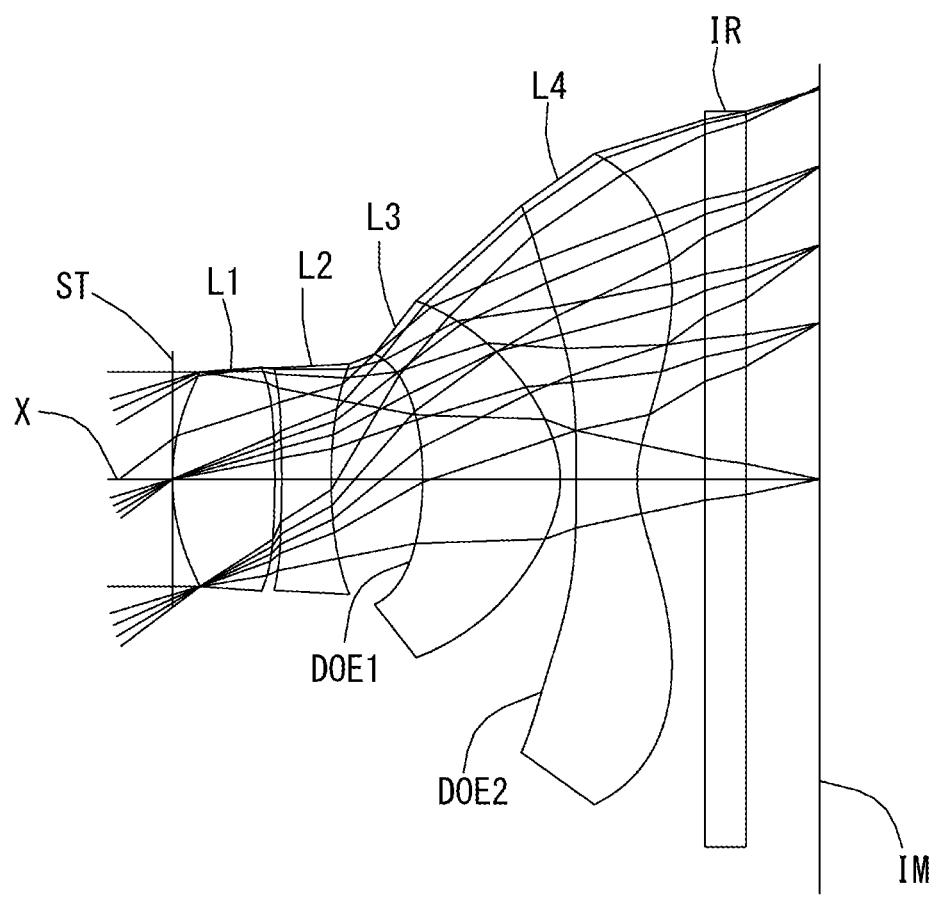
FIG. 1 is a schematic view showing the general configuration of an imaging lens in Example 1.

As shown in FIG. 1, the imaging lens according to this embodiment includes, in order from an object side to an image side, an aperture stop ST, a first lens L1 with positive refractive power, a second lens L2 with negative refractive power, a third lens L3 with positive refractive power, and a fourth lens L4 with negative refractive power. A first diffraction optical surface DOE1 is formed on the object-side surface of the third lens L3. Also, a second diffraction optical surface DOE2 is formed on the concave object-side surface of the fourth lens L4. The first diffraction optical surface DOE1 may be formed on any one of the lens surfaces of the first lens L1 to the third lens L3 on which diffraction efficiency can be increased. For example, it is formed on the image-side surface of the first lens L1 in Example 3, on the object-side surface of the first lens L1 in Example 4, and on the image-side surface of the second lens L2 in Example 6.

Figure 11:
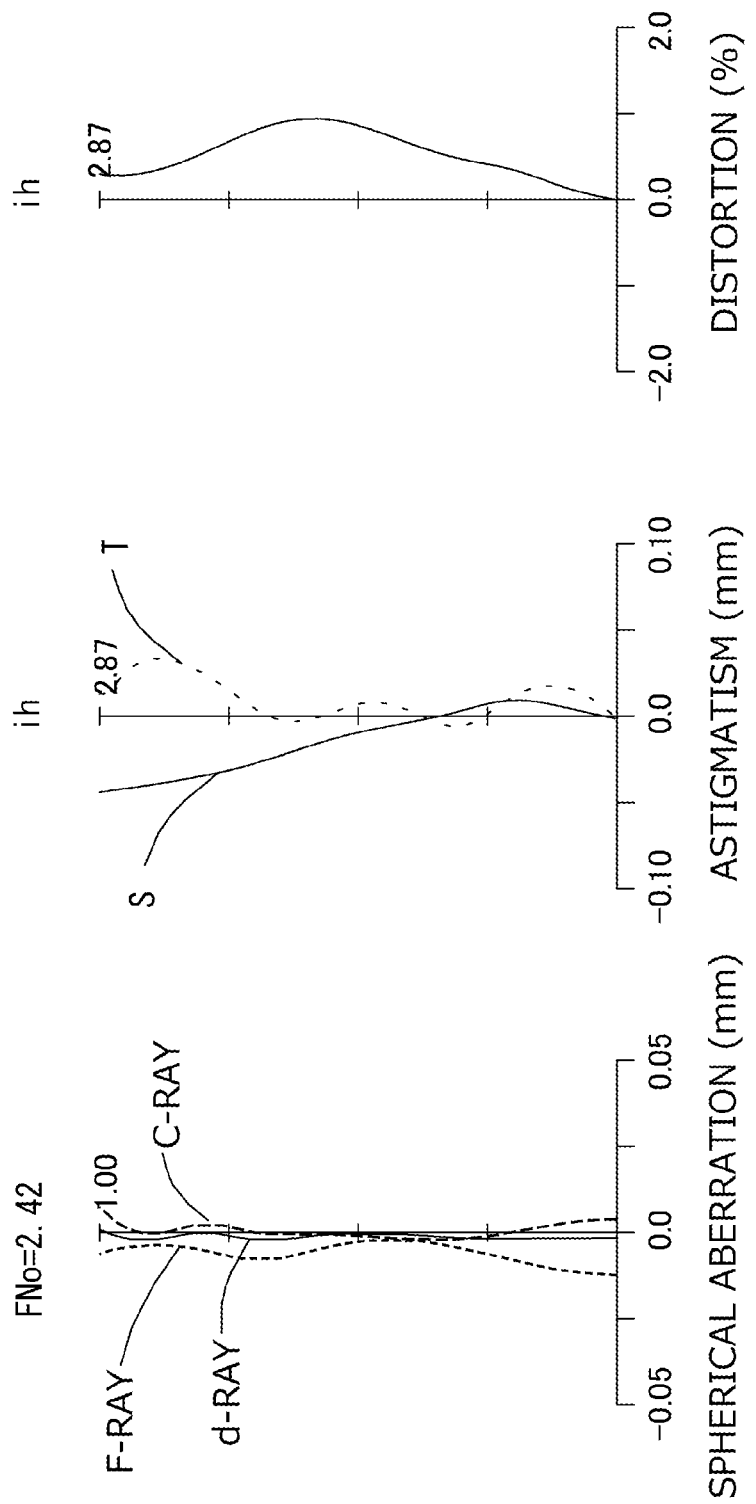
FIG. 11 shows spherical aberration, astigmatism, and distortion of the imaging lens in Example 4.
Figure 12:
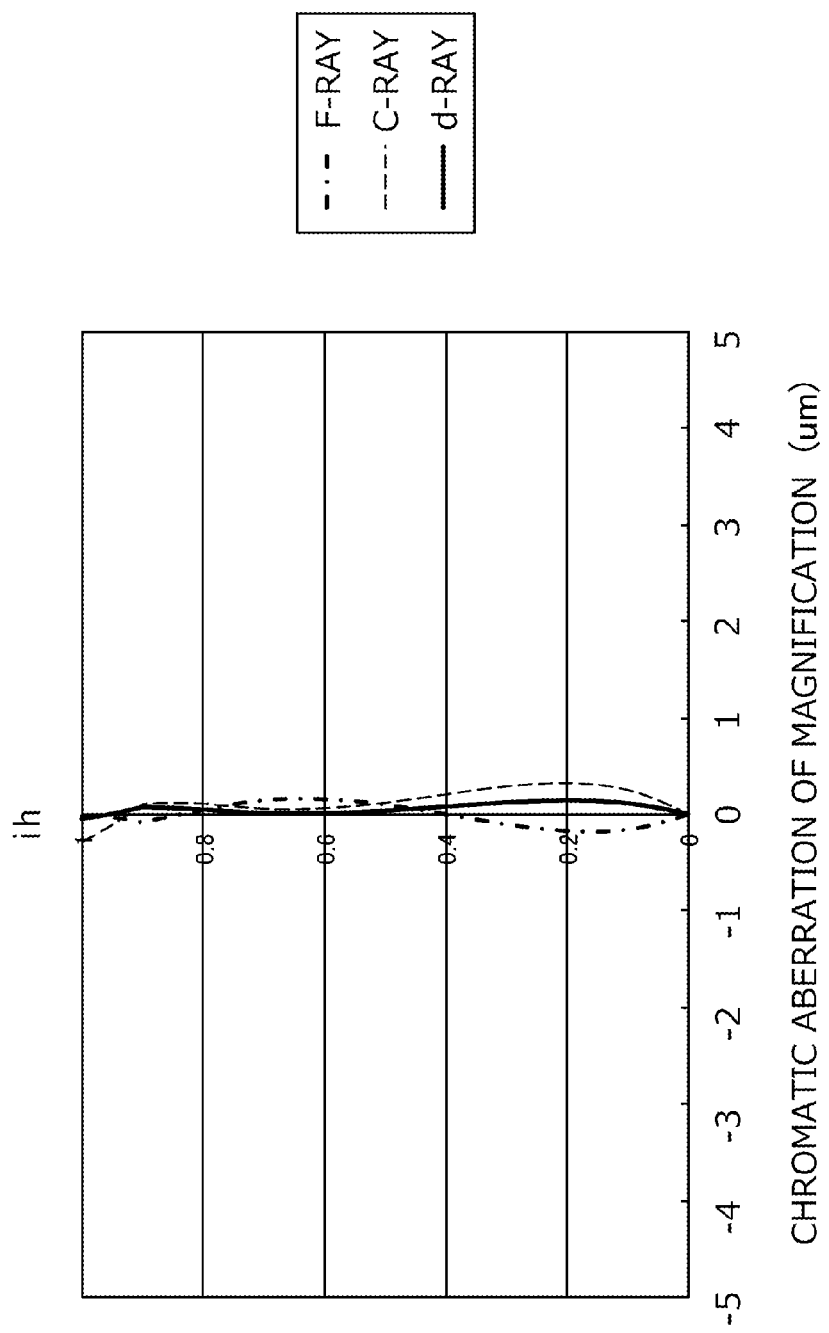
FIG. 12 shows chromatic aberration of magnification of the imaging lens in Example 4.
Figure 13:
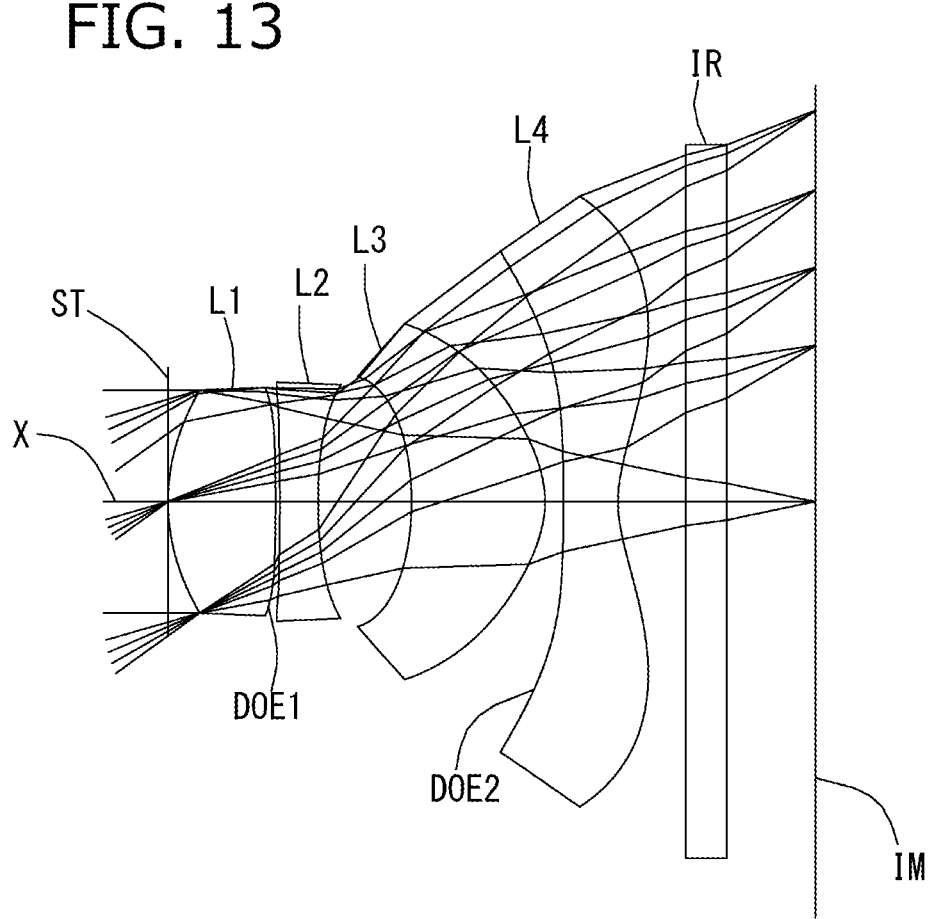
FIG. 13 is a schematic view showing the general configuration of an imaging lens in Example 5.

Since the object-side surface of the first lens L1 is directly visible to the user, it is considered from the viewpoint of the appearance of the product that the fewer orbicular zones it has, the better it is. In Example 4 according to this embodiment, the first diffraction optical surface DOE1 is formed on the object-side surface of the first lens L1, and the object-side surface has only one orbicular zone, posing no problem in terms of product appearance. Even though the diffraction optical surface has only one orbicular zone, it properly corrects chromatic aberrations, particularly at low image height. The second diffraction optical surface corrects chromatic aberrations at high image height. Thus, as shown in FIGS. 11 and 12, chromatic aberrations from low image height to high image height are properly corrected.

All the constituent lenses are uncemented and disposed independently, and all the lens surfaces are aspheric, implying that the diffraction optical surfaces DOE1 and DOE2 are formed on aspheric surfaces. A filter IR is located between the image-side surface of the fourth lens L4 and the image plane IM. The filter IR is omissible.

The first lens L1 is a biconvex lens in which the object-side surface and the image-side surface are both convex, the second lens L2 is a biconcave lens in which the object-side surface and the image-side surface are both concave, the third lens L3 is a meniscus lens in which the object-side surface is concave and the image-side surface is convex, and the fourth lens L4 is a biconcave lens in which the object-side surface and the image-side surface are both concave near an optical axis X.

The shapes of the first lens L1 and the second lens L2 are not limited to the shapes according to this embodiment. The first lens L1 has only to be a lens with positive refractive power having a convex surface on the object side; for example, it may be a meniscus lens having a convex surface on the object side, provided that its manufacturing error sensitivity does not increase. It is also possible that the second lens L2 is a meniscus lens having a concave surface on the image side.

The constituent lenses of each imaging lens according to this embodiment are all made of plastic material and can be mass-produced at low cost.

The imaging lenses according to the present invention satisfy the following conditional expressions:

$$0.0 < r6/r7 < 0.1 \quad (1)$$

$$-0.1 < r8/r7 < 0.0 \quad (2)$$

$$-0.07 < f/(v2 \cdot f2) + f/(vd13 \cdot fd13) < -0.02 \quad (3)$$

$$0.0 < f/fd13 < 0.1 \quad (4)$$

$$-0.07 < f/(v2 \cdot f2) + f/(vd4 \cdot fd4) < -0.02 \quad (5)$$

$$0.0 < f/fd4 < 0.1 \quad (6)$$

$$0.6 < TTL/2ih < 0.9 \quad (7)$$

$$0.5 < f1/f < 0.8 \quad (8)$$

$$-1.50 < f2/f < -0.85 \quad (9)$$

$$0.3 < f3/f < 0.6 \quad (10)$$

$$-0.6 < f4/f < -0.3 \quad (11)$$

where
r6: curvature radius of the image-side surface of the third lens L3
r7: curvature radius of the object-side surface of the fourth lens L4
r8: curvature radius of the image-side surface of the fourth lens L4
f: focal length of the overall optical system of the imaging lens
f1: focal length of the first lens L1
f2: focal length of the second lens L2
f3: focal length of the third lens L3
f4: focal length of the fourth lens L4
fd13: focal length of the first diffraction optical surface DOE1
fd4: focal length of the second diffraction optical surface DOE2
v2: Abbe number of the second lens L2 at d-ray
vd13: Abbe number of the first diffraction optical surface DOE1 at d-ray
vd4: Abbe number of the second diffraction optical surface DOE2 at d-ray
TTL: distance on the optical axis X from the object-side surface of an optical element located nearest to the object to the image plane IM without the filter IR, etc.
ih: maximum image height In this embodiment, all the lens surfaces are aspheric. The aspheric shapes of these lens surfaces are expressed by Equation 1, where Z denotes an axis in the optical axis direction, Y denotes a height perpendicular to the optical axis, K denotes a conic constant, and $A_{2i}$ denotes an aspheric surface coefficient.

$$Z = \frac{\frac{Y^2}{R}}{1 + \sqrt{1 - (1+K) \times \frac{Y^2}{R^2}}} + \sum_{i=1}^{8} A_{2i} \times Y^{2i} \quad \text{Equation 1}$$

An optical path difference which occurs due to a diffraction grating is expressed by optical path difference function P defined by Equation 2, where Y denotes a height from the optical axis and $B_{2i}$ denotes a coefficient of the n-th order (even-order) of an optical path difference function. For the optical path difference functions shown in Tables 1 to 6, the reference wavelength is 520 nm.

$$P = \sum_{i=1}^{7} B_{2i} Y^{2i} \quad \text{Equation 2}$$

Next, examples of the imaging lenses according to this embodiment will be explained. In each example, f denotes the focal length of the overall optical system of the imaging lens, Fno denotes an F-number, ω denotes a half field of view, and ih denotes a maximum image height. i denotes a surface number counted from the object side, r denotes a curvature radius, d denotes the distance between lens surfaces on the optical axis (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface, and DOE1 and DOE 2 each denote a surface where a diffraction optical surface is formed.

Example 1

The basic lens data of Example 1 is shown below in Table 1. The first diffraction optical surface DOE1 is formed on the object-side surface of the third lens L3, and the second diffraction optical surface DOE2 is formed on the object-side surface of the fourth lens L4.

TABLE 1

Example 1
in mm f = 3.822
Fno = 2.42
ω(°) = 37.1
ih = 2.872

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* (Stop) | 1.575 | 0.752 | 1.5346 | 56.16 |
| 2* | −6.128 | 0.051 | | |
| 3* | −7.936 | 0.364 | 1.6142 | 25.58 |
| 4* | 3.836 | 0.672 | | |
| 5*(DOE1) | −2.409 | 1.013 | 1.5441 | 55.98 |
| 6* | −0.765 | 0.117 | | |
| 7*(DOE2) | −31.000 | 0.446 | 1.5346 | 56.16 |
| 8* | 0.892 | 0.500 | | |
| 9 | Infinity | 0.300 | 1.5168 | 64.20 |
| 10 | Infinity | 0.551 | | |
| Image Plane | Infinity | | | |

Constituent Lens Data

| Lens | Start Surface | Focal Length |
|---|---|---|
| 1 | 1 | 2.426 |
| 2 | 3 | −4.161 |
| 3 | 5 | 1.698 |
| 4 | 7 | −1.619 |

Aspheric Surface Data

| | 1st Surface | 2nd Surface | 3rd Surface | 4th Surface |
|---|---|---|---|---|
| k | −4.930E+00 | 0.000E+00 | 4.695E+01 | 8.289E+00 |
| A4 | 1.548E−01 | 1.073E−01 | 1.763E−01 | 1.026E−01 |

TABLE 1-continued

Example 1
in mm

| | | | | |
|---|---|---|---|---|
| A6 | −1.212E−01 | −4.602E−01 | −4.775E−01 | −1.212E−01 |
| A8 | 1.258E−01 | 2.458E−01 | 2.337E−01 | 4.800E−02 |
| A10 | −1.259E−01 | 0.000E+00 | 5.278E−02 | 5.008E−02 |
| A12 | 0.000E+00 | 0.000E+00 | 5.677E−02 | −3.323E−02 |
| A14 | 0.000E+00 | 0.000E+00 | 0.000E+00 | 0.000E+00 |
| A16 | 0.000E+00 | 0.000E+00 | 0.000E+00 | 0.000E+00 |
| | 5th Surface | 6th Surface | 7th Surface | 8th Surface |
| k | 5.631E+00 | −4.018E+00 | 0.000E+00 | −6.902E+00 |
| A4 | −7.555E−02 | −2.697E−01 | −1.170E−01 | −9.987E−02 |
| A6 | 3.046E−03 | 2.510E−01 | 5.431E−02 | 4.970E−02 |
| A8 | 6.345E−01 | −2.247E−01 | −1.031E−02 | −1.932E−02 |
| A10 | −2.189E+00 | 9.410E−01 | 6.847E−04 | 4.975E−03 |
| A12 | 2.602E+00 | −6.194E−03 | 0.000E+00 | −8.259E−04 |
| A14 | −1.025E+00 | −1.040E−02 | 0.000E+00 | 7.950E−05 |
| A16 | −6.615E−02 | 2.331E−03 | 0.000E+00 | −3.466E−06 |

Coefficient of Optical Path Difference Function

| | 5th Surface | 7th Surface |
|---|---|---|
| B1 | 1.685E−03 | −7.741E−04 |
| B2 | −3.994E−02 | 5.822E−04 |
| B3 | 1.256E−01 | −1.552E−04 |
| B4 | −3.591E−02 | 1.669E−05 |
| B5 | −4.733E−01 | −3.889E−06 |
| B6 | 7.989E−01 | −1.778E−06 |
| B7 | −3.893E−01 | 4.986E−07 |

As shown in Table 7, the imaging lens in Example 1 satisfies all the conditional expressions (1) to (11).

Figure 2:
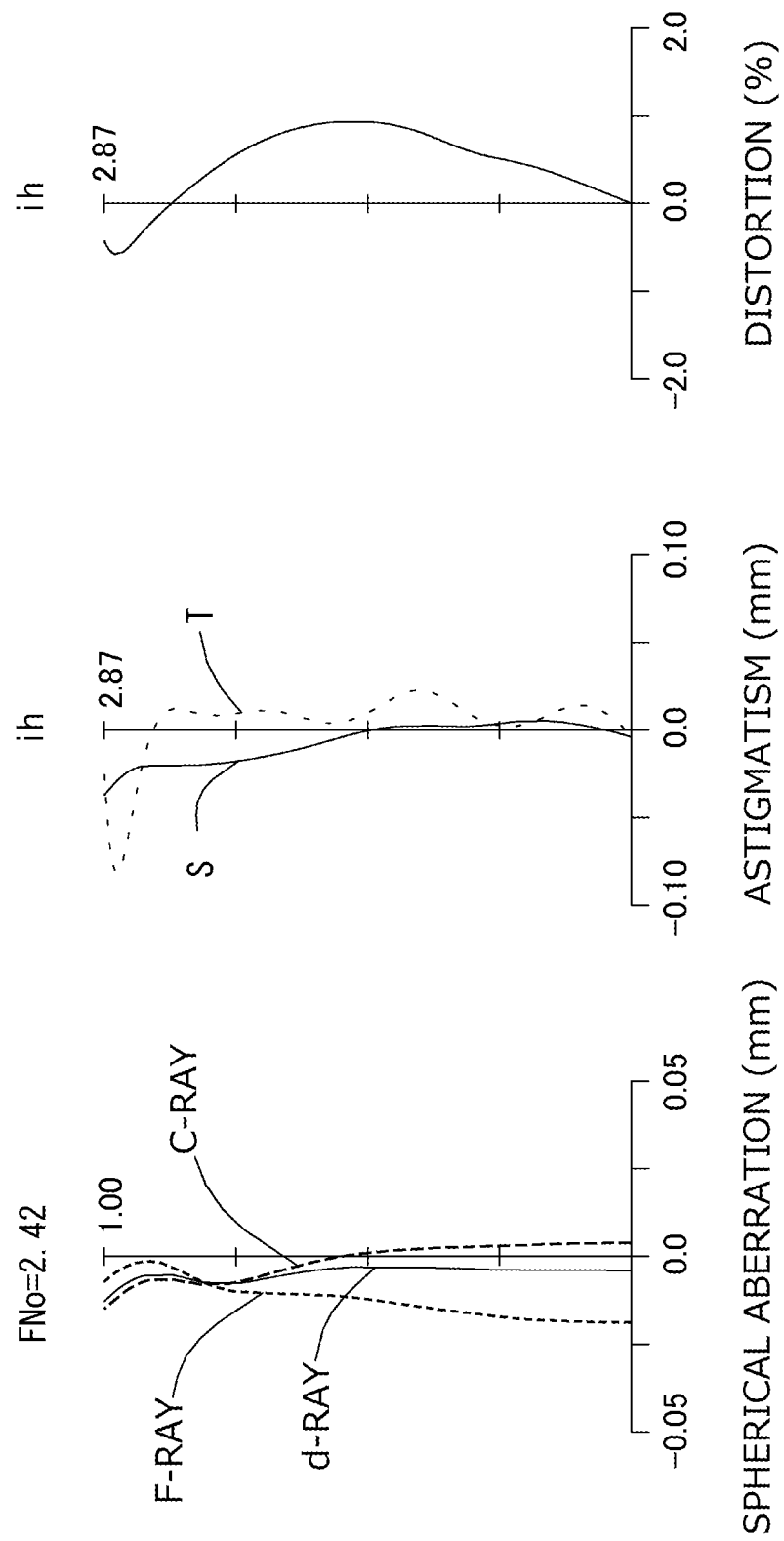
FIG. 2 shows spherical aberration, astigmatism, and distortion of the imaging lens in Example 1.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T (the same is true for FIGS. 5, 8, 11, 14, and 17).

Figure 3:
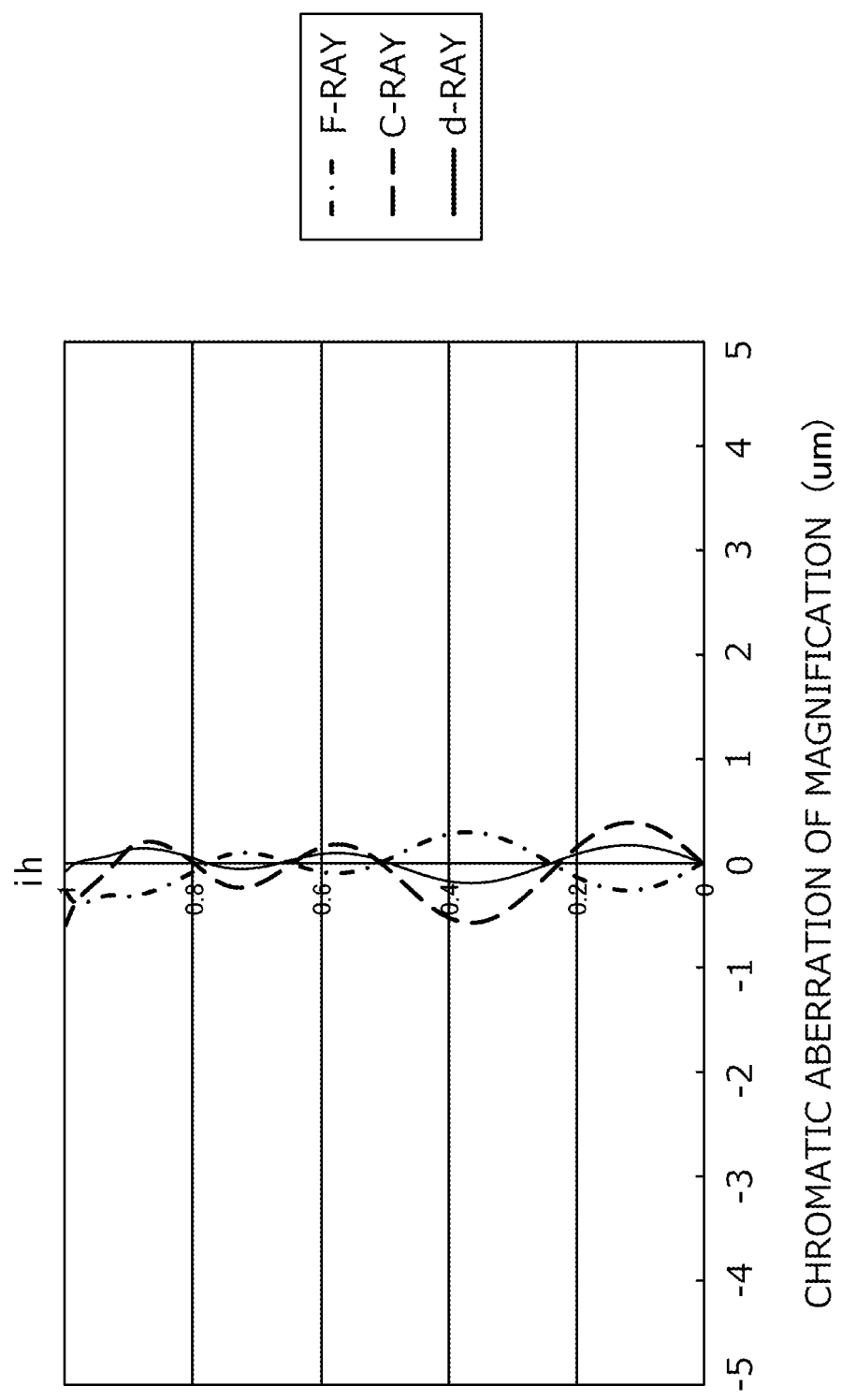
FIG. 3 shows chromatic aberration of magnification of the imaging lens in Example 1.
Figure 4:
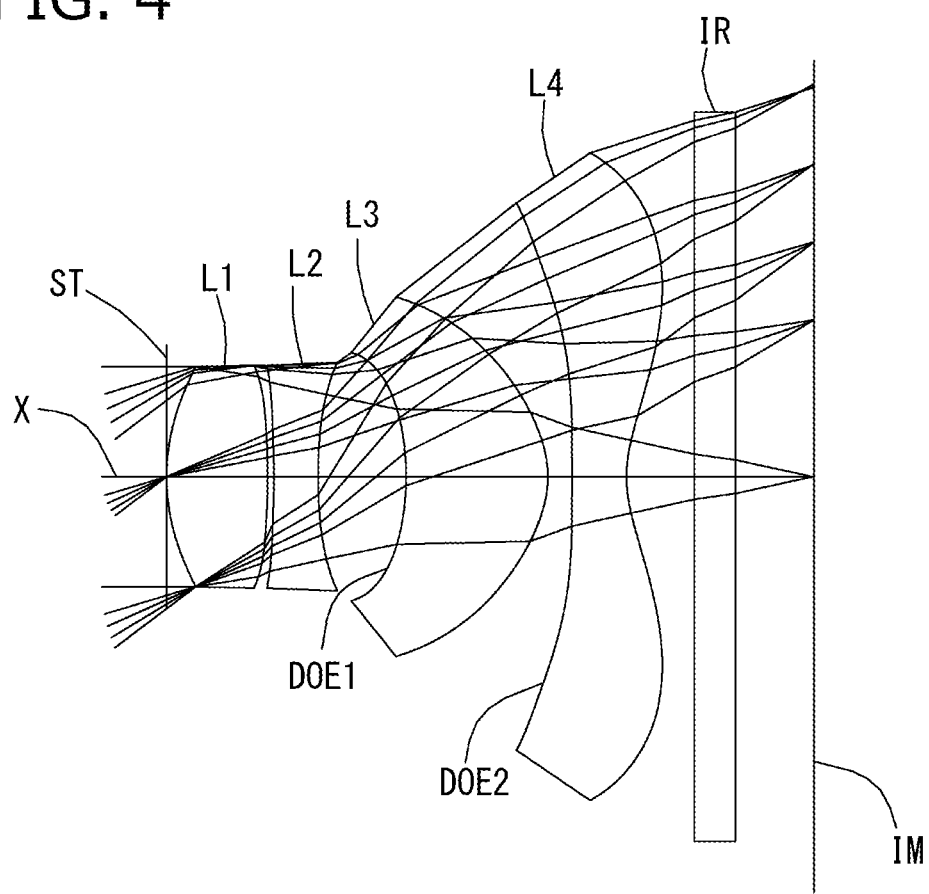
FIG. 4 is a schematic view showing the general configuration of an imaging lens in Example 2.

FIG. 3 shows chromatic aberration of magnification (μm) of the imaging lens in Example 1. This aberration diagram shows the amount of aberration at wavelengths of F-ray (486 nm), d-ray (588 nm), and C-ray (656 nm) (the same is true for FIGS. 6, 9, 12, 15, and 18). As shown in FIGS. 2 and 3, each aberration is corrected properly.

The ratio of total track length TTL to maximum image height ih (TTL/2ih) is 0.812, which suggests that the imaging lens is low-profile and compact. The imaging lens provides high brightness with an F-value of about 2.42 and a wide field of view with a half field of view of about 37 degrees.

Example 2

The basic lens data of Example 2 is shown below in Table 2. The first diffraction optical surface DOE1 is formed on the object-side surface of the third lens L3, and the second diffraction optical surface DOE2 is formed on the object-side surface of the fourth lens L4.

TABLE 2

Example 2
in mm f = 3.799
Fno = 2.40

TABLE 2-continued

Example 2
in mm

ω(°) = 37.1
ih = 2.872

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* (Stop) | 1.551 | 0.743 | 1.5346 | 56.16 |
| 2* | −4.565 | 0.046 | | |
| 3* | −5.005 | 0.326 | 1.6142 | 25.58 |
| 4* | 4.317 | 0.646 | | |
| 5*(DOE1) | −2.005 | 1.042 | 1.5441 | 55.98 |
| 6* | −0.781 | 0.178 | | |
| 7*(DOE2) | −95.890 | 0.400 | 1.5346 | 56.16 |
| 8* | 0.940 | 0.500 | | |
| 9 | Infinity | 0.300 | 1.5168 | 64.20 |
| 10 | Infinity | 0.578 | | |
| Image Plane | Infinity | | | |

Constituent Lens Data

| Lens | Start Surface | Focal Length |
|---|---|---|
| 1 | 1 | 2.261 |
| 2 | 3 | −3.724 |
| 3 | 5 | 1.790 |
| 4 | 7 | −1.747 |

Aspheric Surface Data

| | 1st Surface | 2nd Surface | 3rd Surface | 4th Surface |
|---|---|---|---|---|
| k | −6.945E+00 | 0.000E+00 | 0.000E+00 | 1.869E+01 |
| A4 | 2.197E−01 | 2.103E−01 | 3.122E−01 | 1.405E−01 |
| A6 | −2.231E−01 | −6.203E−01 | −6.569E−01 | −9.946E−02 |
| A8 | 2.348E−01 | 3.325E−01 | 2.447E−01 | −1.581E−01 |
| A10 | −1.918E−01 | 0.000E+00 | 1.946E−01 | 2.953E−01 |
| A12 | 0.000E+00 | 0.000E+00 | 0.000E+00 | −1.221E−01 |
| A14 | 0.000E+00 | 0.000E+00 | 0.000E+00 | 0.000E+00 |
| A16 | 0.000E+00 | 0.000E+00 | 0.000E+00 | 0.000E+00 |
| | 5th Surface | 6th Surface | 7th Surface | 8th Surface |
| k | 3.756E+00 | −3.784E+00 | 0.000E+00 | −6.908E+00 |
| A4 | 2.324E−02 | −2.319E−01 | −7.370E−02 | −8.734E−02 |
| A6 | −1.528E−01 | 1.887E−01 | 1.846E−02 | 4.149E−02 |
| A8 | 4.238E−01 | −1.575E−01 | −8.696E−04 | −1.656E−02 |
| A10 | −1.046E+00 | 6.028E−02 | −1.560E−04 | 4.370E−03 |
| A12 | 1.357E+00 | −1.634E−02 | 0.000E+00 | −7.497E−04 |
| A14 | −7.717E−01 | 7.215E−03 | 0.000E+00 | 7.585E−05 |
| A16 | 7.761E−02 | −3.090E−03 | 0.000E+00 | −3.489E−06 |

Coefficient of Optical Path Difference Function

| | 5th Surface | 7th Surface |
|---|---|---|
| B1 | −4.532E−03 | −1.116E−03 |
| B2 | 1.002E−02 | 1.253E−03 |
| B3 | −1.037E−02 | −4.794E−04 |
| B4 | −2.507E−02 | −4.633E−06 |
| B5 | 4.208E−02 | 1.673E−05 |
| B6 | 2.948E−02 | 3.038E−06 |
| B7 | −5.270E−02 | −9.908E−07 |

As shown in Table 7, the imaging lens in Example 2 satisfies all the conditional expressions (1) to (11).

Figure 5:
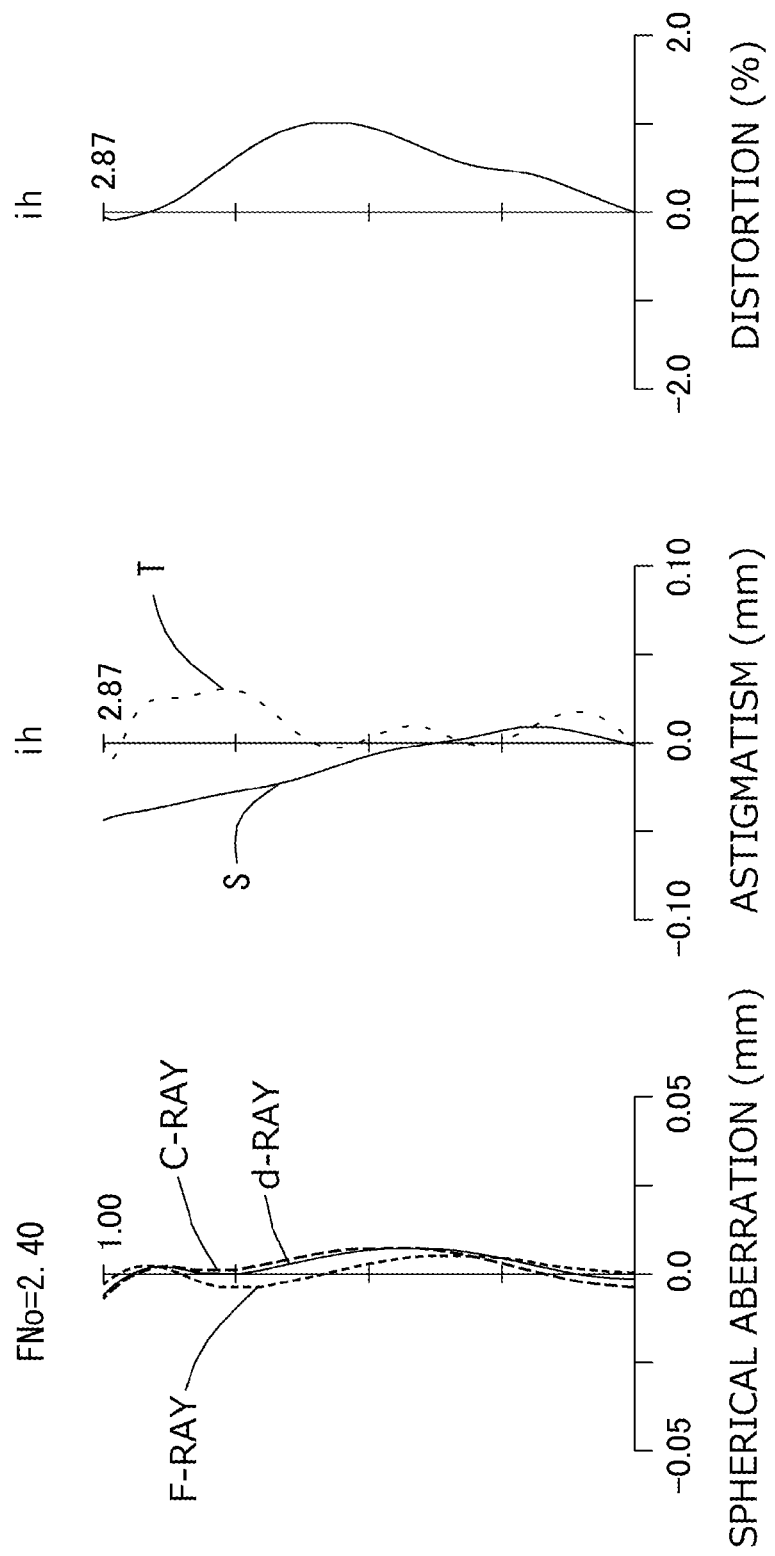
FIG. 5 shows spherical aberration, astigmatism, and distortion of the imaging lens in Example 2.
Figure 6:
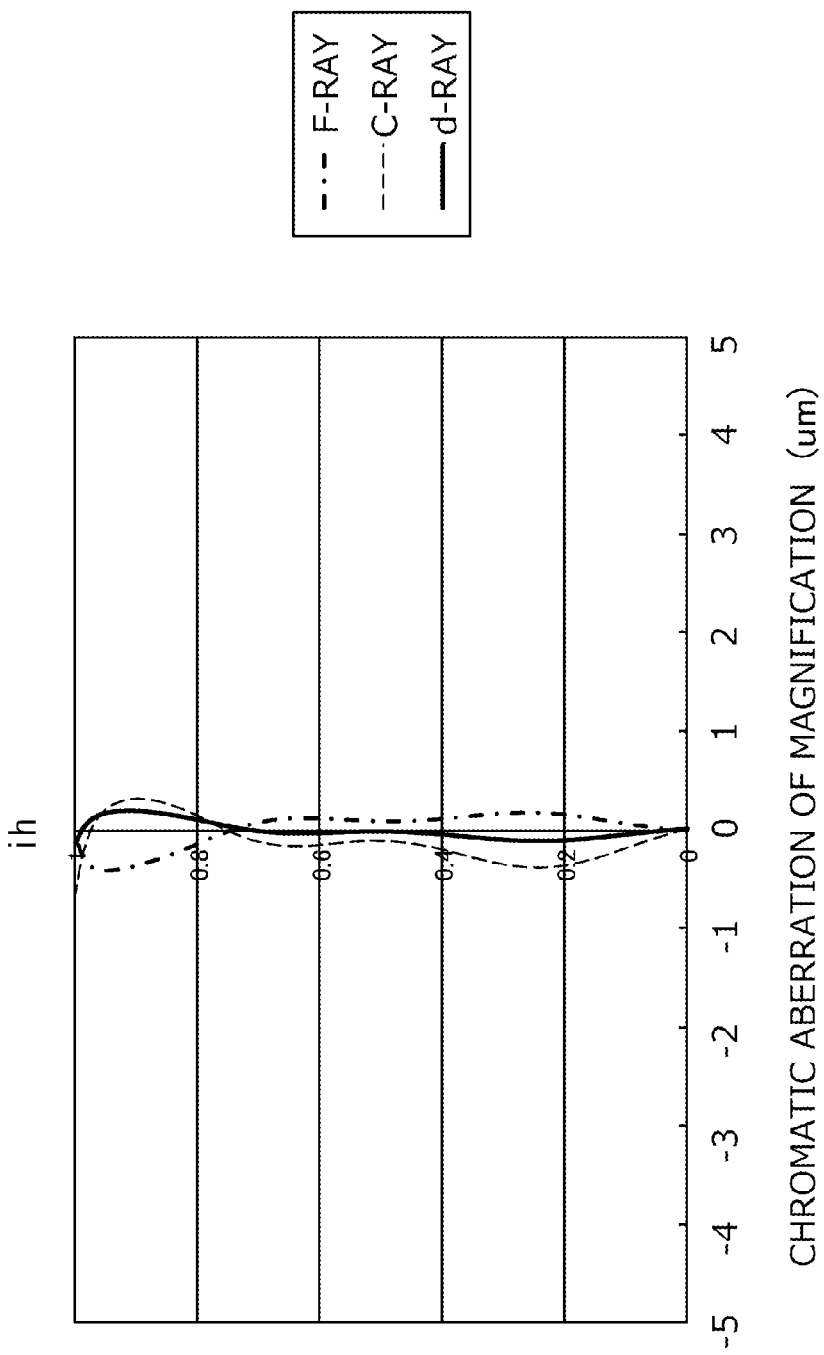
FIG. 6 shows chromatic aberration of magnification of the imaging lens in Example 2.
Figure 7:
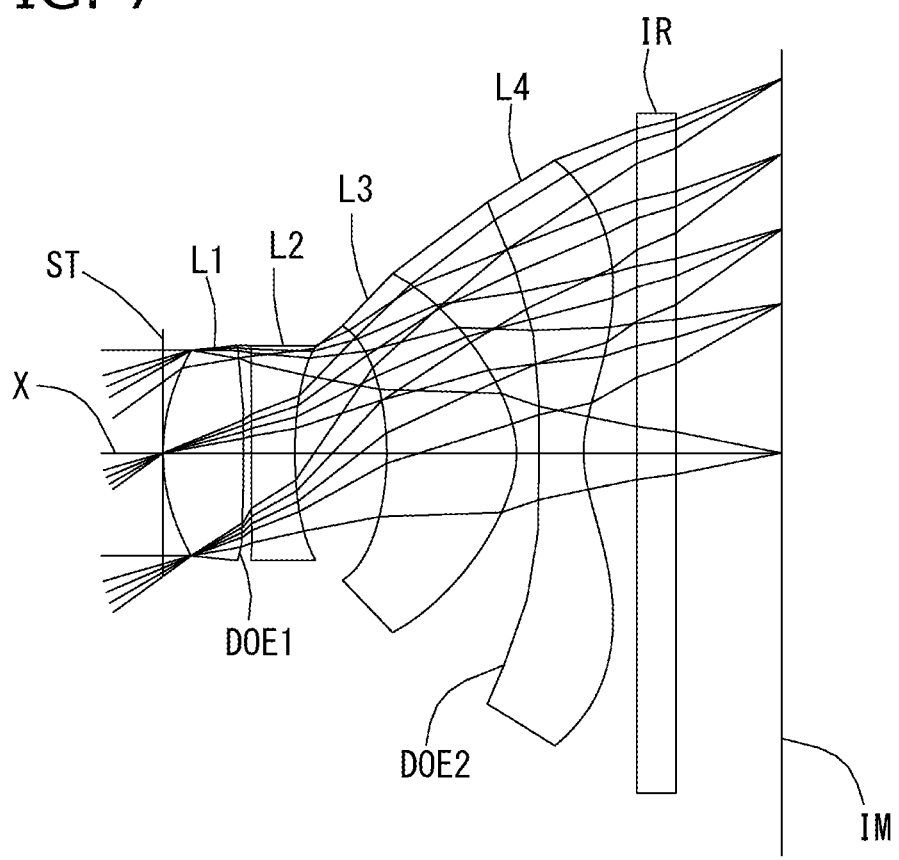
FIG. 7 is a schematic view showing the general configuration of an imaging lens in Example 3.

FIG. 5 shows spherical aberration (mm), astigmatism (mm), and distortion (%) of the imaging lens in Example 2. FIG. 6 shows chromatic aberration of magnification (μm) of the imaging lens in Example 2. As shown in FIGS. 5 and 6, each aberration is corrected properly.

The ratio of total track length TTL to maximum image height ih (TTL/2ih) is 0.811, which suggests that the imaging lens is low-profile and compact. Also the imaging lens provides high brightness with an F-value of 2.40 and a wide field of view with a half field of view of about 37 degrees.

Example 3

The basic lens data of Example 3 is shown below in Table 3. The first diffraction optical surface DOE1 is formed on the image-side surface of the first lens L1, and the second diffraction optical surface DOE2 is formed on the object-side surface of the fourth lens L4.

TABLE 3

Example 3
in mm $f = 3.962$
$Fno = 2.45$
$\omega(°) = 36.0$
$ih = 2.872$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* (Stop) | 1.495 | 0.618 | 1.5346 | 56.16 |
| 2*(DOE1) | −40.197 | 0.061 | | |
| 3* | −40.614 | 0.334 | 1.6142 | 25.58 |
| 4* | 3.610 | 0.704 | | |
| 5* | −2.263 | 0.997 | 1.5346 | 56.16 |
| 6* | −0.788 | 0.173 | | |
| 7*(DOE2) | −40.000 | 0.341 | 1.5346 | 56.16 |
| 8* | 0.960 | 0.409 | | |
| 9 | Infinity | 0.300 | 1.5168 | 64.20 |
| 10 | Infinity | 0.810 | | |
| Image Plane | Infinity | | | |

Constituent Lens Data

| Lens | Start Surface | Focal Length |
|---|---|---|
| 1 | 1 | 2.680 |
| 2 | 3 | −5.382 |
| 3 | 5 | 1.831 |
| 4 | 7 | −1.771 |

Aspheric Surface Data

| | 1st Surface | 2nd Surface | 3rd Surface | 4th Surface |
|---|---|---|---|---|
| k | −1.246E+00 | 9.900E+01 | 0.000E+00 | 1.272E+01 |
| A4 | 5.190E−02 | 1.504E−01 | 2.021E−01 | 1.382E−01 |
| A6 | −5.769E−02 | −4.854E−01 | −3.785E−01 | −1.324E−01 |
| A8 | 1.369E−01 | 2.300E−01 | −6.200E−03 | 1.440E−02 |
| A10 | −1.667E−01 | −1.748E−02 | 2.245E−01 | 7.790E−02 |
| A12 | 0.000E+00 | 0.000E+00 | 0.000E+00 | −1.181E−02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 3.913E+00 | −3.918E+00 | −9.888E+01 | −7.348E+00 |
| A4 | −2.949E−02 | −1.669E−01 | −1.488E−02 | −9.168E−02 |
| A6 | 3.568E−01 | 1.800E−01 | −1.006E−01 | 3.417E−02 |
| A8 | −1.602E+00 | −2.701E−01 | 1.052E−01 | −1.124E−02 |
| A10 | 3.696E+00 | 2.619E−01 | −5.095E−02 | 2.918E−03 |
| A12 | −4.773E+00 | −1.513E−01 | 1.349E−02 | −5.913E−04 |
| A14 | 3.296E+00 | 4.793E−02 | −1.872E−03 | 7.393E−05 |
| A16 | −9.591E−01 | −6.666E−03 | 1.063E−04 | −3.994E−06 |

Coefficient of Optical Path Difference Function

| | 2nd Surface | 7th Surface |
|---|---|---|
| B1 | −2.162E−03 | −2.863E−03 |
| B2 | −1.611E−02 | 3.295E−03 |

TABLE 3-continued

Example 3
in mm

| | | |
|---|---|---|
| B3 | 5.490E−02 | −1.547E−03 |
| B4 | −2.602E−02 | 1.568E−04 |
| B5 | −1.147E−01 | 3.811E−05 |
| B6 | 1.940E−01 | 8.808E−09 |
| B7 | −9.530E−02 | −1.772E−06 |

As shown in Table 7, the imaging lens in Example 3 satisfies all the conditional expressions (1) to (11).

Figure 8:
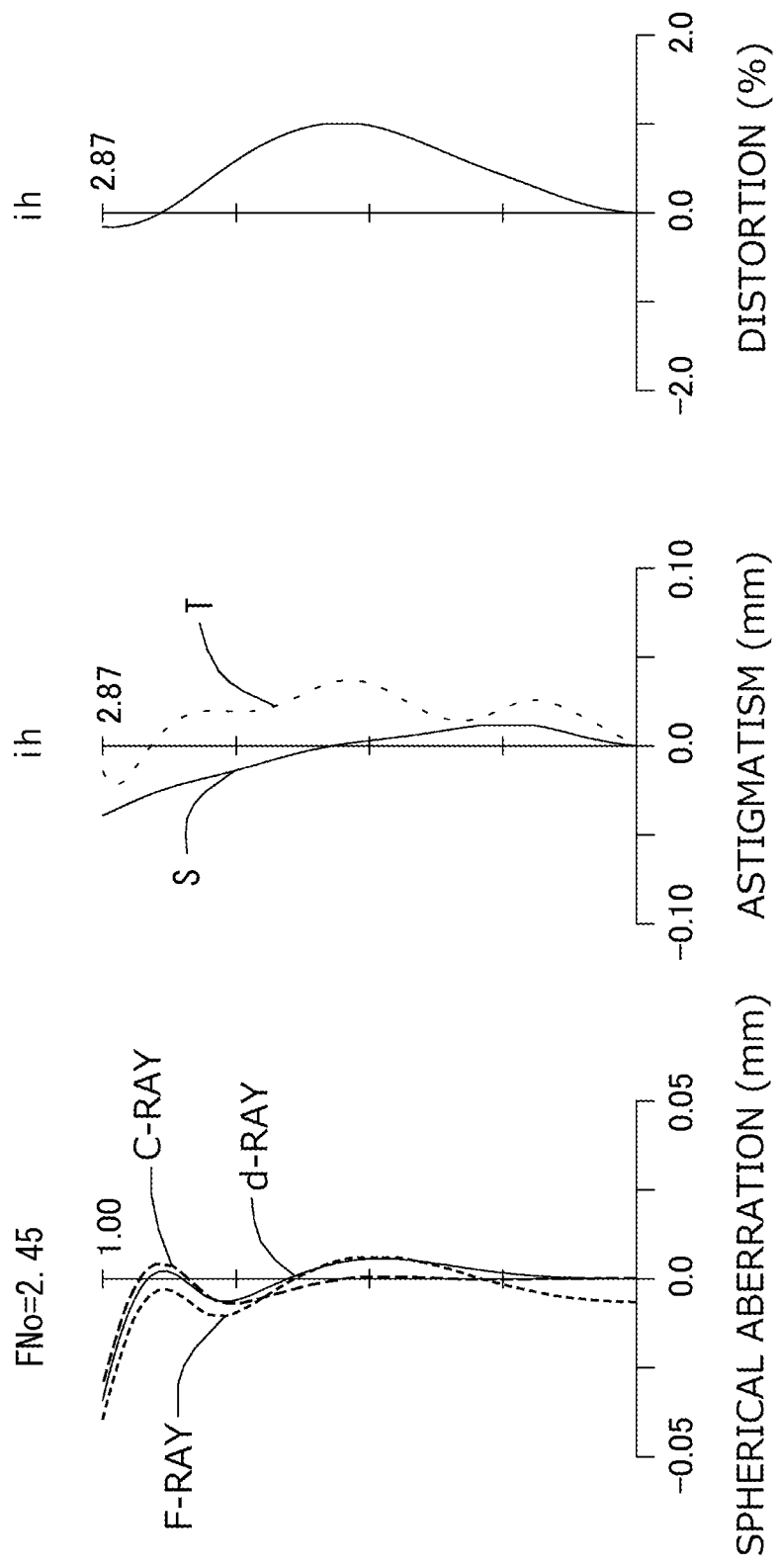
FIG. 8 shows spherical aberration, astigmatism, and distortion of the imaging lens in Example 3.
Figure 9:
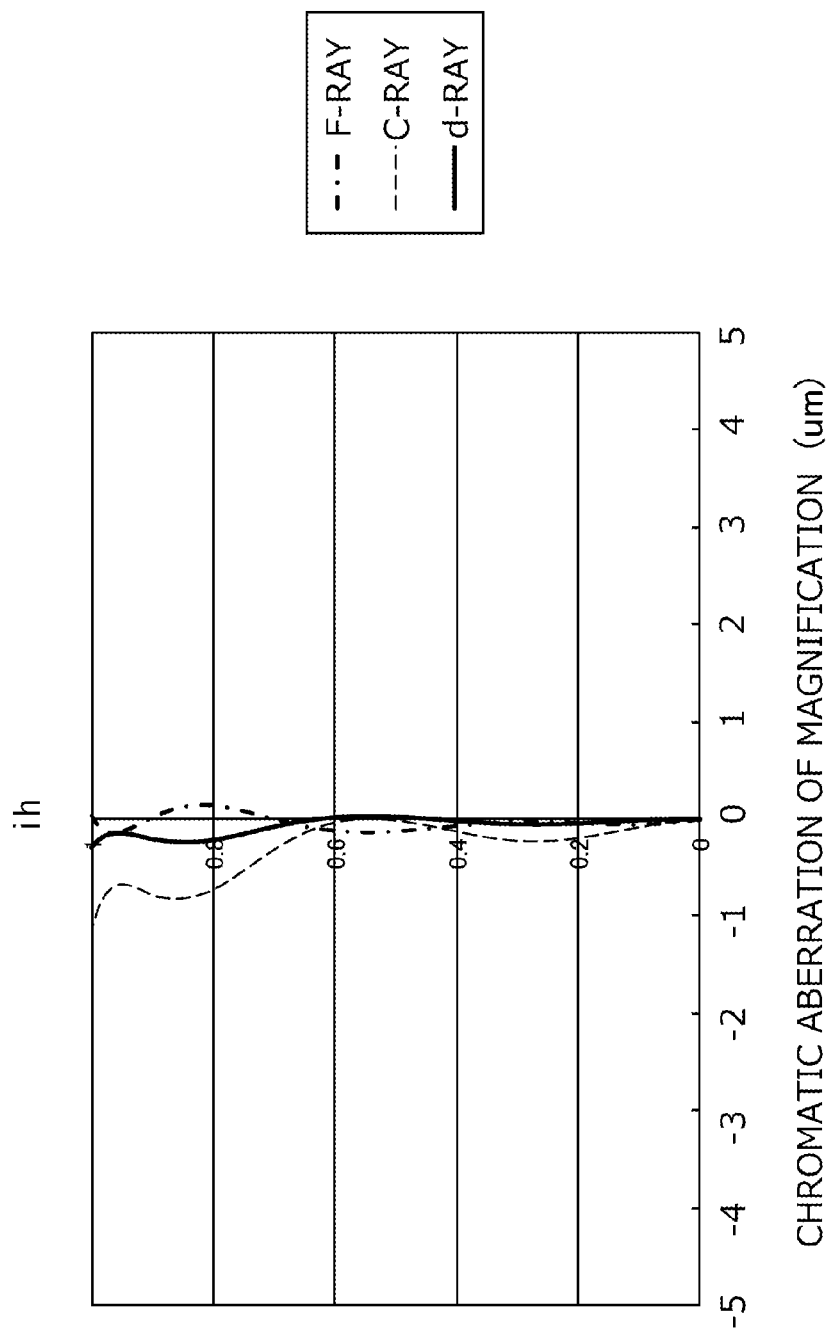
FIG. 9 shows chromatic aberration of magnification of the imaging lens in Example 3.
Figure 10:
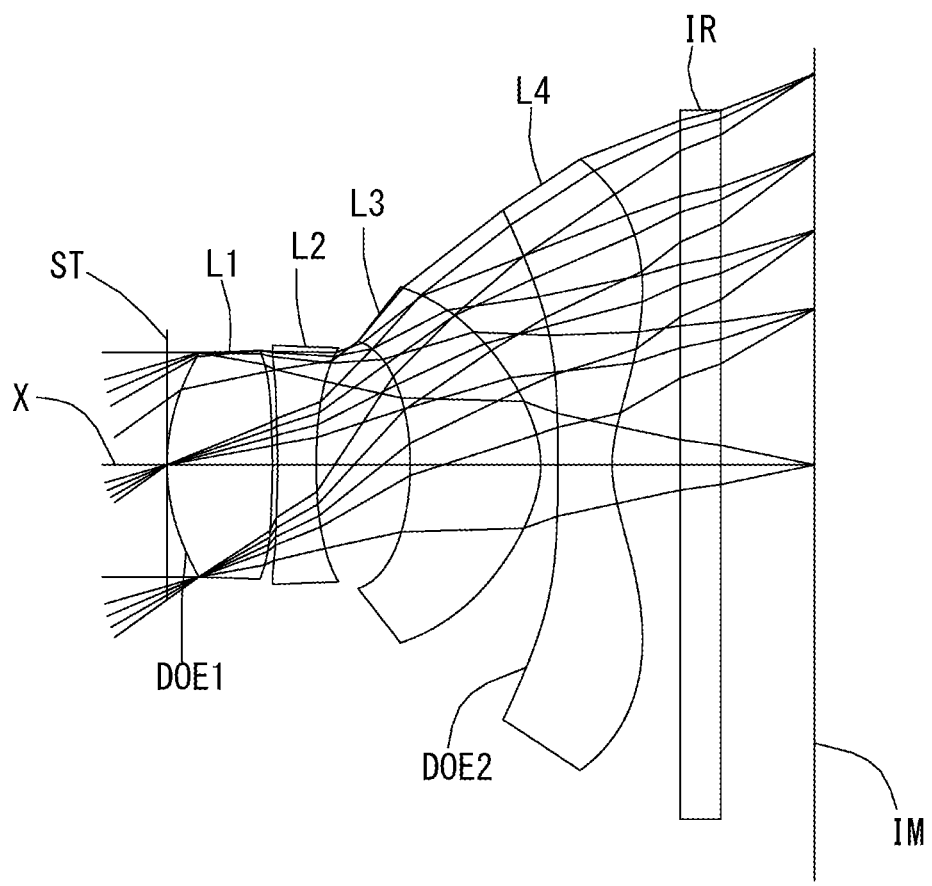
FIG. 10 is a schematic view showing the general configuration of an imaging lens in Example 4.

FIG. 8 shows spherical aberration (mm), astigmatism (mm), and distortion (%) of the imaging lens in Example 3. FIG. 9 shows chromatic aberration of magnification (μm) of the imaging lens in Example 3. As shown in FIGS. 8 and 9, each aberration is corrected properly.

The ratio of total track length TTL to maximum image height ih (TTL/2ih) is 0.809, which suggests that the imaging lens is low-profile and compact. The imaging lens provides high brightness with an F-value of 2.45 and a wide field of view with a half field of view of about 36 degrees.

Example 4

The basic lens data of Example 4 is shown below in Table 4. The first diffraction optical surface DOE1 is formed on the object-side surface of the first lens L1, and the second diffraction optical surface DOE2 is formed on the object-side surface of the fourth lens L4.

TABLE 4

Example 4
in mm $f = 3.991$
$Fno = 2.42$
$\omega(°) = 35.7$
$ih = 2.872$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* (Stop) (DOE1) | 1.493 | 0.774 | 1.5346 | 56.16 |
| 2* | −6.097 | 0.038 | | |
| 3* | −6.097 | 0.285 | 1.6142 | 25.58 |
| 4* | 4.195 | 0.691 | | |
| 5* | −2.002 | 0.959 | 1.5441 | 55.98 |
| 6* | −0.765 | 0.125 | | |
| 7*(DOE2) | −32.810 | 0.400 | 1.5346 | 56.16 |
| 8* | 0.940 | 0.500 | | |
| 9 | Infinity | 0.300 | 1.5168 | 64.20 |
| 10 | Infinity | 0.694 | | |
| Image Plane | Infinity | | | |

Constituent Lens Data

| Lens | Start Surface | Focal Length |
|---|---|---|
| 1 | 1 | 2.324 |
| 2 | 3 | −4.004 |
| 3 | 5 | 1.789 |
| 4 | 7 | −1.704 |

Aspheric Surface Data

| | 1st Surface | 2nd Surface | 3rd Surface | 4th Surface |
|---|---|---|---|---|
| k | −7.437E+00 | 0.000E+00 | 0.000E+00 | 1.993E+01 |
| A4 | 2.357E−01 | 1.678E−01 | 2.774E−01 | 1.420E−01 |
| A6 | −1.793E−01 | −5.491E−01 | −5.891E−01 | −1.029E−01 |

TABLE 4-continued

Example 4
in mm

| | | | | |
|---|---|---|---|---|
| A8 | 1.347E−01 | 3.137E−01 | 2.400E−01 | −1.590E−01 |
| A10 | −1.044E−01 | 0.000E+00 | 1.715E−01 | 3.186E−01 |
| A12 | 0.000E+00 | 0.000E+00 | 0.000E+00 | −1.543E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 3.709E+00 | −4.128E+00 | 0.000E+00 | −8.168E+00 |
| A4 | 2.204E−02 | −2.251E−01 | −7.235E−02 | −9.065E−02 |
| A6 | −1.544E−01 | 1.950E−01 | 1.735E−02 | 4.141E−02 |
| A8 | 4.806E−01 | −1.613E−01 | −1.051E−03 | −1.646E−02 |
| A10 | −1.078E+00 | 5.970E−02 | −8.817E−05 | 4.353E−03 |
| A12 | 1.269E+00 | −1.368E−02 | 0.000E+00 | −7.500E−04 |
| A14 | −7.285E−01 | 5.792E−03 | 0.000E+00 | 7.598E−05 |
| A16 | 1.083E−01 | −2.860E−03 | 0.000E+00 | −3.518E−06 |

Coefficient of Optical Path Difference Function

| | 1st Surface | 7th Surface |
|---|---|---|
| B1 | −1.609E−04 | −2.502E−04 |
| B2 | −1.841E−02 | −9.189E−05 |
| B3 | 9.302E−02 | −2.088E−05 |
| B4 | −2.477E−01 | −2.653E−06 |
| B5 | 4.070E−01 | −3.331E−07 |
| B6 | −3.866E−01 | −3.670E−08 |
| B7 | 1.598E−01 | −1.600E−09 |

As shown in Table 7, the imaging lens in Example 4 satisfies all the conditional expressions (1) to (11).

FIG. 11 shows spherical aberration (mm), astigmatism (mm), and distortion (%) of the imaging lens in Example 4. FIG. 12 shows chromatic aberration of magnification (μm) of the imaging lens in Example 4. As shown in FIGS. 11 and 12, each aberration is corrected properly.

The ratio of total track length TTL to maximum image height ih (TTL/2ih) is 0.811, which suggests that the imaging lens is low-profile and compact. The imaging lens provides high brightness with an F-value of 2.42 and a wide field of view with a half field of view of about 36 degrees.

Example 5

The basic lens data of Example 5 is shown below in Table 5. The first diffraction optical surface DOE1 is formed on the image-side surface of the first lens L1, and the second diffraction optical surface DOE2 is formed on the object-side surface of the fourth lens L4.

TABLE 5

Example 5
in mm f = 3.967
Fno = 2.42
ω(°) = 35.8
ih = 2.872

| Surface No. i | Curvature Radius r | Surface Distance d | Refractive Index Nd | Abbe Number vd |
|---|---|---|---|---|
| (Object Surface) | Infinity | Infinity | | |
| 1* (Stop) | 1.504 | 0.794 | 1.5346 | 56.16 |
| 2*(DOE1) | −8.281 | 0.031 | | |
| 3* | −8.284 | 0.281 | 1.6142 | 25.58 |
| 4* | 4.195 | 0.687 | | |
| 5* | −2.003 | 0.980 | 1.5441 | 55.98 |
| 6* | −0.773 | 0.135 | | |
| 7*(DOE2) | −31.000 | 0.401 | 1.5346 | 56.16 |
| 8* | | 0.940 | 0.500 | |
| 9 | Infinity | 0.300 | 1.5168 | 64.20 |
| 10 | Infinity | 0.655 | | |
| Image Plane | Infinity | | | |

Constituent Lens Data

| Lens | Start Surface | Focal Length |
|---|---|---|
| 1 | 1 | 2.422 |
| 2 | 3 | −4.496 |
| 3 | 5 | 1.805 |
| 4 | 7 | −1.701 |

Aspheric Surface Data

| | 1st Surface | 2nd Surface | 3rd Surface | 4th Surface |
|---|---|---|---|---|
| k | −4.949E+00 | 0.000E+00 | 0.000E+00 | 1.920E+01 |
| A4 | 1.717E−01 | 1.810E−01 | 2.741E−01 | 1.397E−01 |
| A6 | −1.248E−01 | −6.109E−01 | −5.900E−01 | −7.941E−02 |
| A8 | 1.240E−01 | 3.696E−01 | 2.700E−01 | −1.511E−01 |
| A10 | −1.016E−01 | 0.000E+00 | 1.295E−01 | 2.615E−01 |
| A12 | 0.000E+00 | 0.000E+00 | 0.000E+00 | −1.088E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 3.651E+00 | −4.144E+00 | 0.000E+00 | −8.087E+00 |
| A4 | 3.140E−02 | −2.218E−01 | −7.888E−02 | −9.184E−02 |
| A6 | −1.737E−01 | 1.856E−01 | 1.694E−02 | 4.153E−02 |
| A8 | 4.857E−01 | −1.557E−01 | −9.883E−04 | −1.651E−02 |
| A10 | −1.038E+00 | 6.046E−02 | −6.544E−05 | 4.355E−03 |
| A12 | 1.285E+00 | −1.581E−02 | 0.000E+00 | −7.499E−04 |
| A14 | −8.581E−01 | 6.482E−03 | 0.000E+00 | 7.590E−05 |
| A16 | 2.161E−01 | −2.860E−03 | 0.000E+00 | −3.535E−06 |

Coefficient of Optical Path Difference Function

| | 2nd Surface | 7th Surface |
|---|---|---|
| B1 | −2.594E−03 | −3.451E−04 |
| B2 | −6.041E−03 | 8.184E−05 |
| B3 | 1.146E−02 | −3.433E−05 |
| B4 | 2.446E−02 | −5.371E−06 |
| B5 | −5.135E−02 | −7.381E−07 |
| B6 | 1.861E−02 | −9.311E−08 |
| B7 | −7.880E−05 | −8.229E−09 |

As shown in Table 7, the imaging lens in Example 5 satisfies all the conditional expressions (1) to (11).

Figure 14:
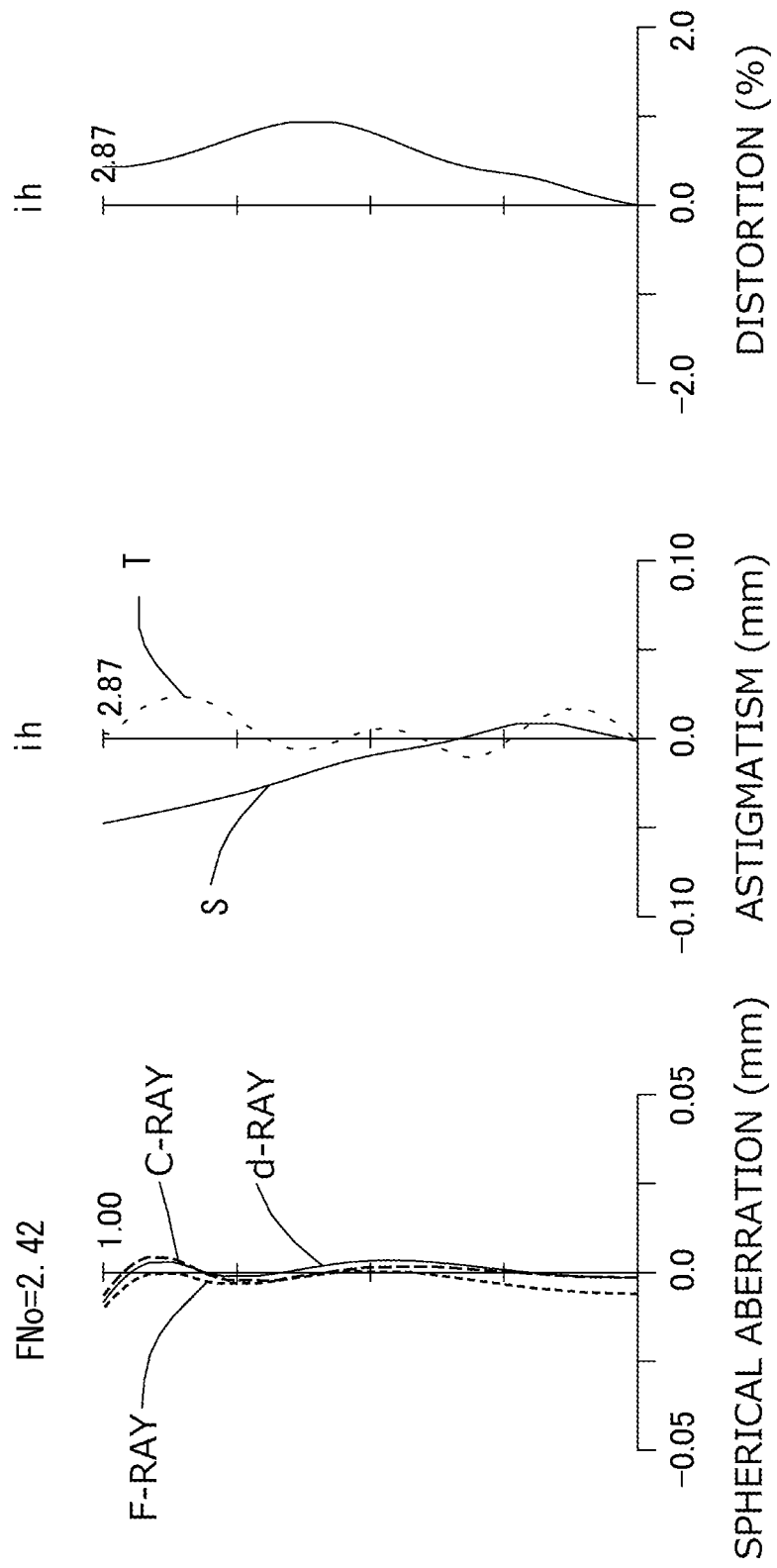
FIG. 14 shows spherical aberration, astigmatism, and distortion of the imaging lens in Example 5.
Figure 15:
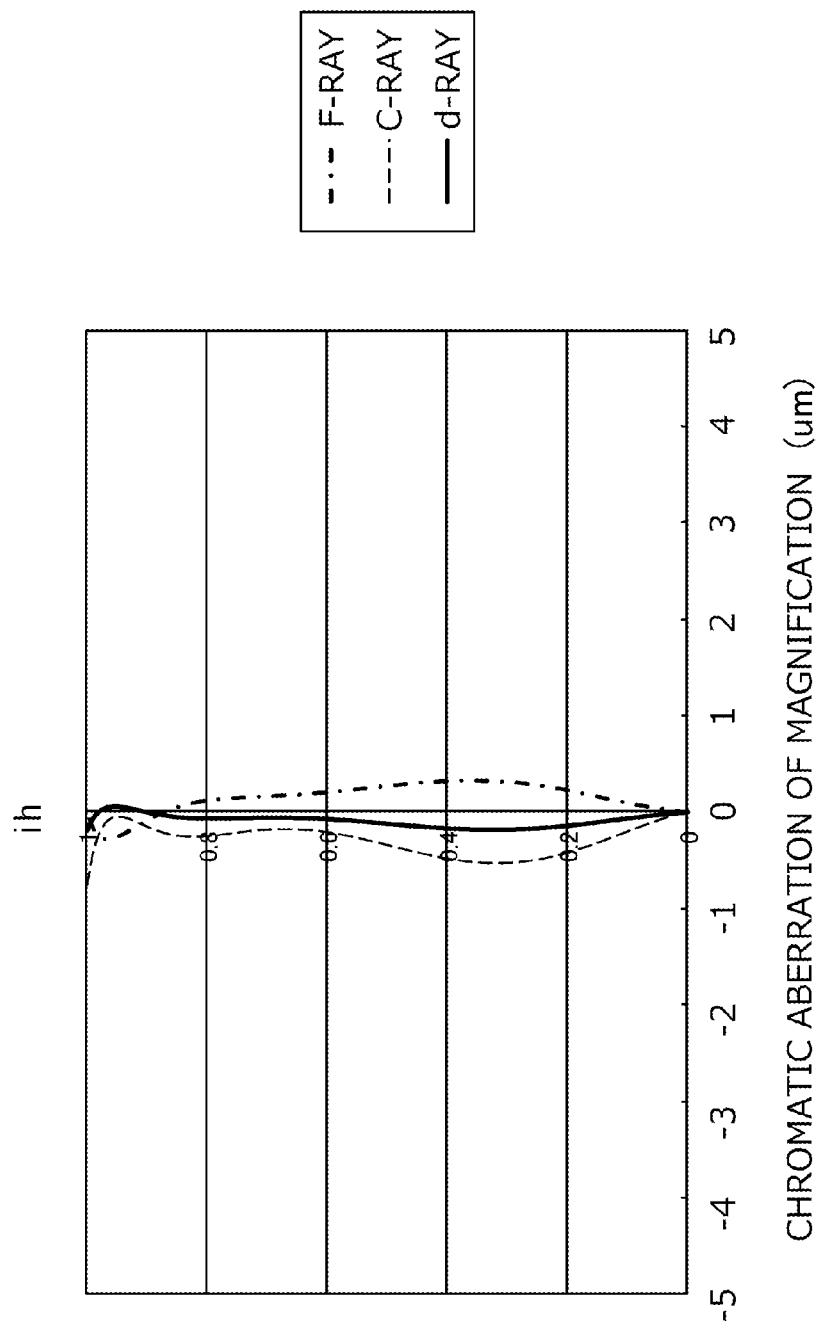
FIG. 15 shows chromatic aberration of magnification of the imaging lens in Example 5.
Figure 16:
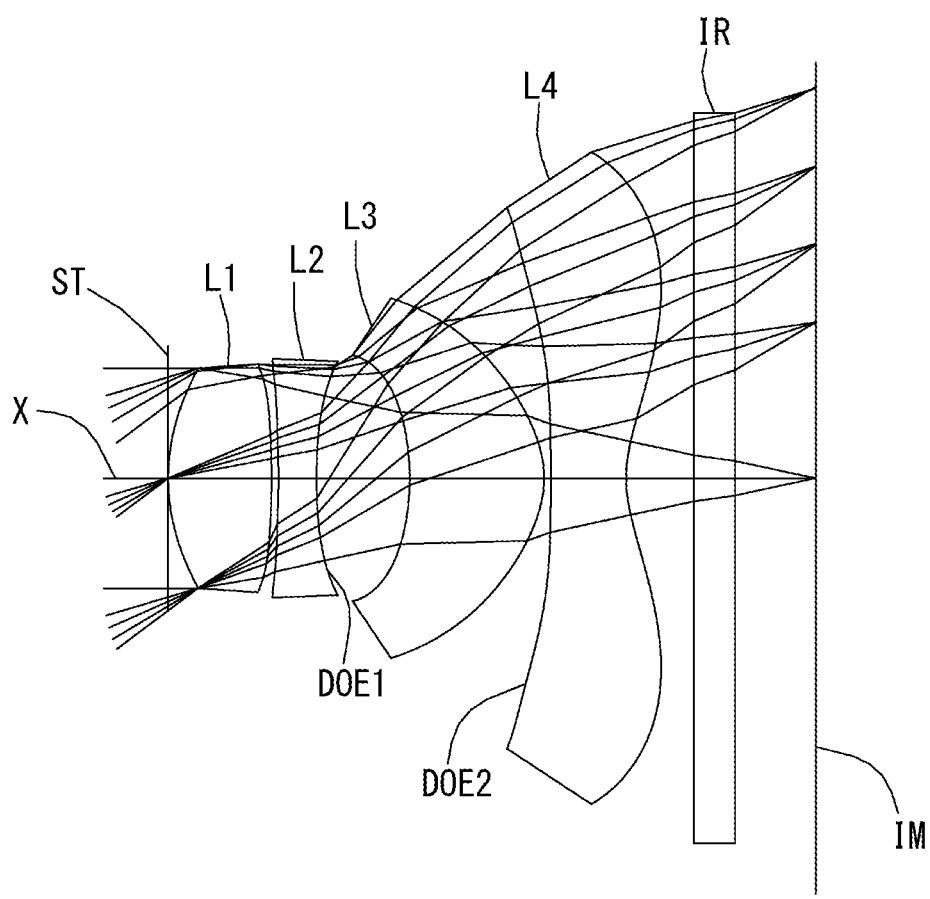
FIG. 16 is a schematic view showing the general configuration of an imaging lens in Example 6.

FIG. 14 shows spherical aberration (mm), astigmatism (mm), and distortion (%) of the imaging lens in Example 5. FIG. 15 shows chromatic aberration of magnification (μm) of the imaging lens in Example 5. As shown in FIGS. 14 and 15, each aberration is corrected properly.

The ratio of total track length TTL to maximum image height ih (TTL/2ih) is 0.811, which suggests that the imaging lens is low-profile and compact. The imaging lens provides high brightness with an F-value of 2.42 and a wide field of view with a half field of view of about 36 degrees.

Example 6

The basic lens data of Example 6 is shown below in Table 6. The first diffraction optical surface DOE1 is formed on the image-side surface of the second lens L2, and the second diffraction optical surface DOE2 is formed on the object-side surface of the fourth lens L4.

TABLE 6

Example 6
in mm f = 3.826
Fno = 2.41
ω(°) = 36.8
ih = 2.872

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* (Stop) | 1.519 | 0.760 | 1.5346 | 56.16 |
| 2* | −5.238 | 0.050 | | |
| 3* | −5.422 | 0.280 | 1.6142 | 25.58 |
| 4*(DOE1) | 4.298 | 0.684 | | |
| 5* | −1.951 | 0.989 | 1.5441 | 55.98 |
| 6* | −0.759 | 0.049 | | |
| 7*(DOE2) | −31.000 | 0.554 | 1.5346 | 56.16 |
| 8* | 0.940 | 0.500 | | |
| 9 | Infinity | 0.300 | 1.5168 | 64.20 |
| 10 | Infinity | 0.594 | | |
| Image Plane | Infinity | | | |

Constituent Lens Data

| Lens | Start Surface | Focal Length |
|---|---|---|
| 1 | 1 | 2.292 |
| 2 | 3 | −3.986 |
| 3 | 5 | 1.766 |
| 4 | 7 | −1.715 |

Aspheric Surface Data

| | 1st Surface | 2nd Surface | 3rd Surface | 4th Surface |
|---|---|---|---|---|
| k | −6.574E+00 | 0.000E+00 | 0.000E+00 | 2.050E+01 |
| A4 | 2.211E−01 | 1.546E−01 | 2.845E−01 | 1.378E−01 |
| A6 | −2.216E−01 | −4.913E−01 | −5.715E−01 | −9.332E−02 |
| A8 | 2.316E−01 | 2.510E−01 | 2.198E−01 | −1.667E−01 |
| A10 | −1.825E−01 | 0.000E+00 | 1.635E−01 | 2.991E−01 |
| A12 | 0.000E+00 | 0.000E+00 | 0.000E+00 | −1.334E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 3.602E+00 | −3.788E+00 | 0.000E+00 | −7.575E+00 |
| A4 | 3.494E−03 | −2.333E−01 | −6.317E−02 | −8.163E−02 |

TABLE 6-continued

Example 6
in mm

| A6 | −1.401E−01 | 1.801E−01 | 1.886E−02 | 3.946E−02 |
|---|---|---|---|---|
| A8 | 4.161E−01 | −1.477E−01 | −1.204E−03 | −1.618E−02 |
| A10 | −1.028E+00 | 5.789E−02 | −1.462E−04 | 4.347E−03 |
| A12 | 1.350E+00 | −1.913E−02 | 0.000E+00 | −7.514E−04 |
| A14 | −9.203E−01 | 8.051E−03 | 0.000E+00 | 7.608E−05 |
| A16 | 2.350E−01 | −2.683E−03 | 0.000E+00 | −3.472E−06 |

Coefficient of Optical Path Difference Function

| | 4th Surface | 7th Surface |
|---|---|---|
| B1 | −3.523E−03 | −2.315E−03 |
| B2 | 8.585E−03 | 2.448E−03 |
| B3 | −1.334E−02 | −1.019E−03 |
| B4 | −8.584E−03 | 8.989E−05 |
| B5 | 4.092E−02 | 2.086E−05 |
| B6 | −4.421E−03 | 8.988E−07 |
| B7 | −3.885E−02 | −1.010E−06 |

As shown in Table 7, the imaging lens in Example 6 satisfies all the conditional expressions (1) to (11).

Figure 17:
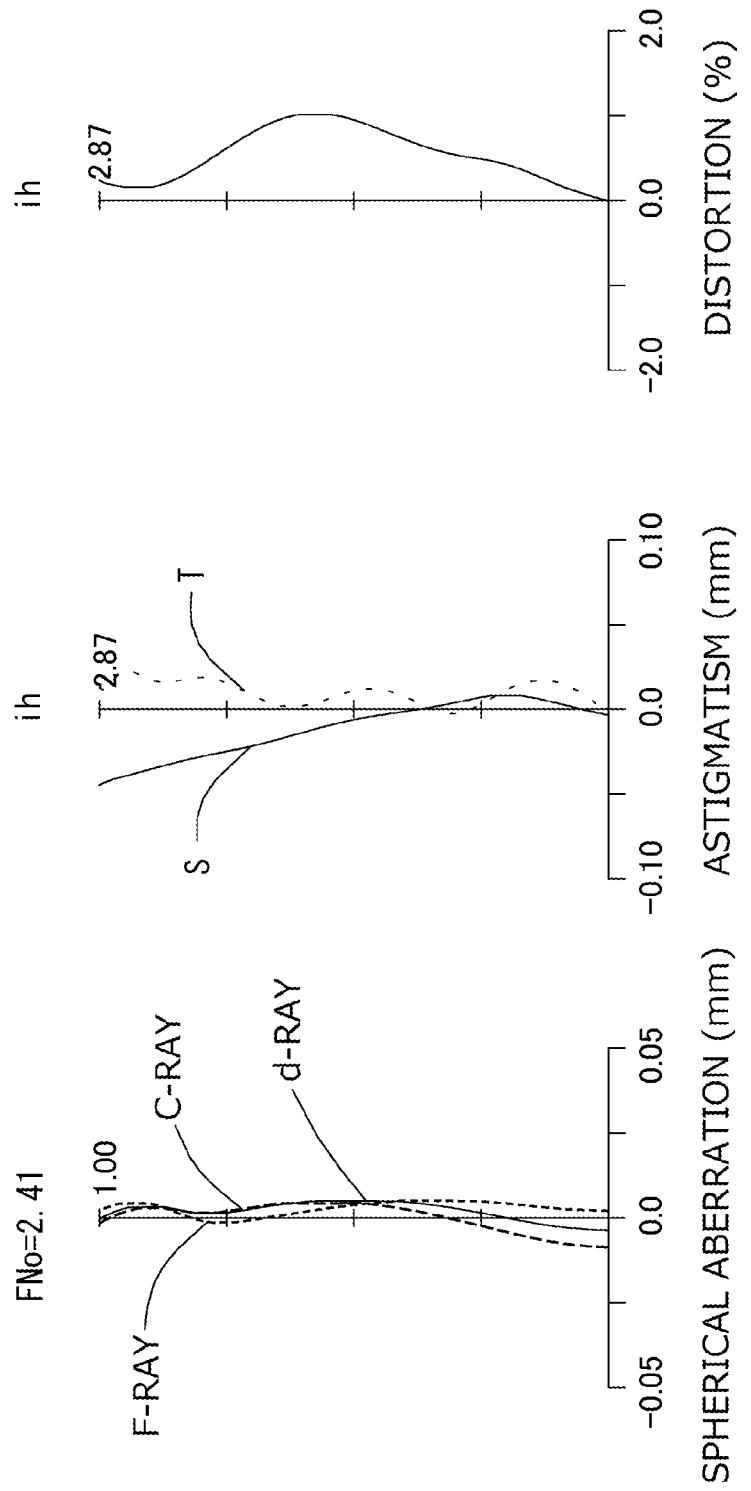
FIG. 17 shows spherical aberration, astigmatism, and distortion of the imaging lens in Example 6.
Figure 18:
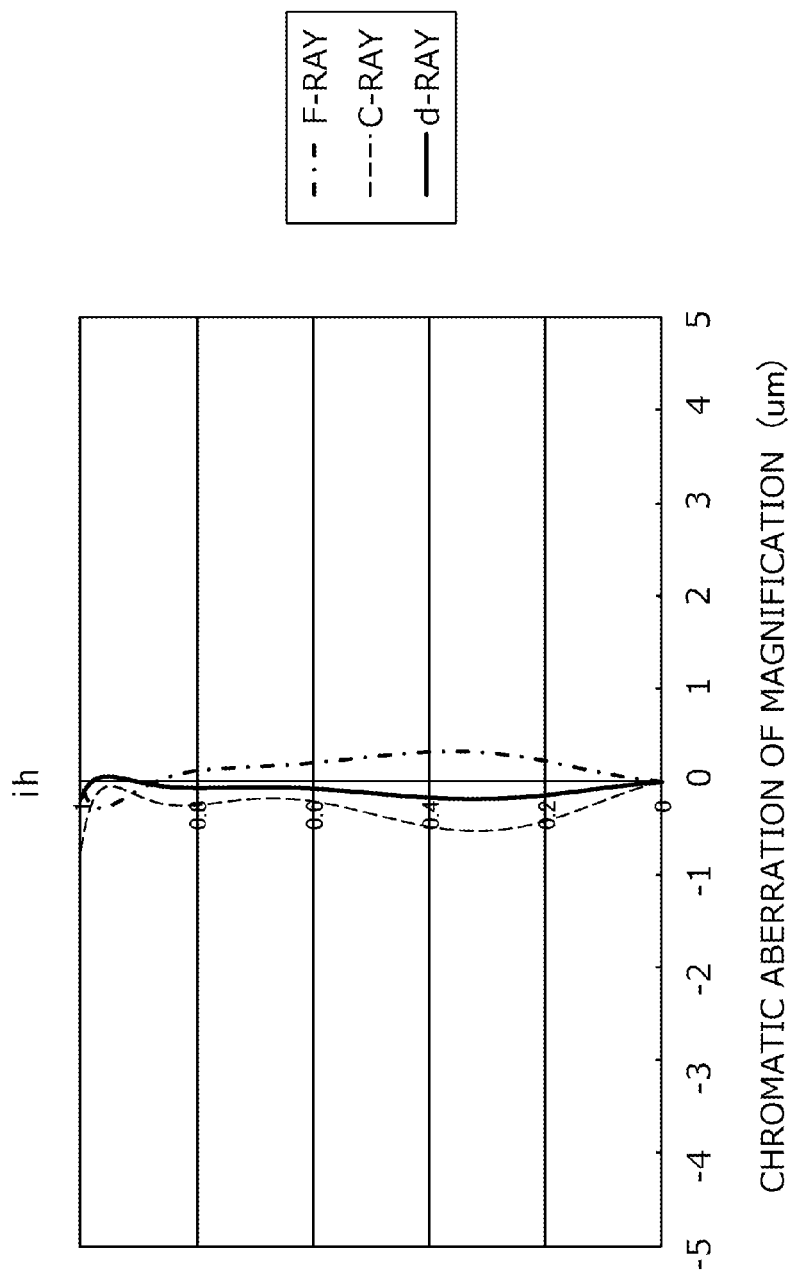
FIG. 18 shows chromatic aberration of magnification of the imaging lens in Example 6.

FIG. 17 shows spherical aberration (mm), astigmatism (mm), and distortion (%) of the imaging lens in Example 6. FIG. 18 shows chromatic aberration of magnification (μm) of the imaging lens in Example 6. As shown in FIGS. 17 and 18, each aberration is corrected properly.

The ratio of total track length TTL to maximum image height ih (TTL/2ih) is 0.810, which suggests that the imaging lens is low-profile and compact. The imaging lens provides high brightness with an F-value of 2.41 and a wide field of view with a half field of view of about 37 degrees.

As explained above, the imaging lenses according to the preferred embodiment of the present invention are compact and low-profile with total track length TTL of 4.7 mm or less, and the ratio of total track length TTL to maximum image height ih (TTL/2ih) of about 0.8. Although they only use four constituent lenses, these imaging lenses correct aberrations properly, and particularly correct chromatic aberrations of magnification very effectively. Also, they provide high brightness with an F-value of about 2.4 and a relatively wide field of view of about 72 degrees.

Table 7 shows data on Examples 1 to 6 in relation to the conditional expressions (1) to (11).

TABLE 7

| | Example 1 | Example 2 | Example 3 | Example 4 | Example 5 | Example 6 |
|---|---|---|---|---|---|---|
| Conditional Expression (1) $0.0 < r6/r7 < 0.1$ | 0.025 | 0.008 | 0.020 | 0.023 | 0.025 | 0.024 |
| Conditional Expression (2) $-0.1 < r8/r7 < 0.0$ | −0.029 | −0.010 | −0.024 | −0.029 | −0.030 | −0.030 |
| Conditional Expression (3) $-0.07 < f/(v2 \cdot f2) + f/(vd13 \cdot fd13) < -0.02$ | −0.040 | −0.050 | −0.034 | −0.039 | −0.041 | −0.046 |
| Conditional Expression (4) $0.0 < f/fd\,13 < 0.1$ | 0.014 | 0.036 | 0.018 | 0.001 | 0.022 | 0.028 |
| Conditional Expression (5) $-0.07 < f/(v2 \cdot f2) + f/(vd4 \cdot fd4) < -0.02$ | −0.038 | −0.042 | −0.036 | −0.040 | −0.035 | −0.043 |
| Conditional Expression (6) $0.0 < f/fd4 < 0.1$ | 0.006 | 0.009 | 0.024 | 0.002 | 0.003 | 0.019 |
| Conditional Expression (7) $0.6 < TTL/2ih < 0.9$ | 0.812 | 0.811 | 0.809 | 0.811 | 0.811 | 0.810 |
| Conditional Expression (8) $0.5 < f1/f < 0.8$ | 0.635 | 0.595 | 0.676 | 0.582 | 0.611 | 0.599 |
| Conditional Expression (9) $-1.50 < f2/f < -0.85$ | −1.089 | −0.980 | −1.358 | −1.003 | −1.133 | −1.042 |
| Conditional Expression (10) $0.3 < f3/f < 0.6$ | 0.444 | 0.471 | 0.462 | 0.448 | 0.455 | 0.461 |
| Conditional Expression (11) $-0.6 < f4/f < -0.3$ | −0.424 | −0.460 | −0.447 | −0.427 | −0.429 | −0.448 |

In recent years, the imaging lenses composed of four constituent lenses according to an embodiment of the present invention are suitable for use in imaging optical systems mounted in mobile terminals such as mobile phones and smart phones, and PDAs (Personal Digital Assistants) which have a growing tendency towards a low-profile design and an increase in the number of pixels.

What is claimed is:

1. An imaging lens for a solid-state image sensor in which elements are arranged in order from an object side to an image side, comprising:
    a first lens with positive refractive power having a convex surface on the object side;
    a second lens with negative refractive power having a concave surface on the image side;
    a third lens with positive refractive power as a meniscus lens having a convex surface on the image side; and
    a fourth lens with negative refractive power having a concave surface on each of the object side and the image side near an optical axis,
    wherein a first diffraction optical surface is formed on one of lens surfaces of the first to third lenses, a second diffraction optical surface is formed on the object-side surface of the fourth lens, the object-side surface of the fourth lens is forming a uniformly changing aspheric surface without a pole-change point or inflection point, and
    conditional expressions (1), (2), (5), and (6) below are satisfied:

$$0.0 < r6/r7 < 0.1; \tag{1}$$

$$-0.1 < r8/r7 < 0.0; \tag{2}$$

$$-0.07 < f/(v2 \cdot f2) + f/(vd4 \cdot fd4) < -0.02; \tag{5}$$

$$0.0 < f/fd4 < 0.1; \tag{6}$$

where
r6: curvature radius of the image-side surface of the third lens;
r7: curvature radius of the object-side surface of the fourth lens;
r8: curvature radius of the image-side surface of the fourth lens;
f: focal length of an overall optical system of the imaging lens;
f2: focal length of the second lens;
fd4: focal length of the second diffraction optical surface;
v2: Abbe number of the second lens at d-ray; and
vd4: Abbe number of the second diffraction optical surface at d-ray.

2. The imaging lens according to claim 1,
wherein conditional expressions (3) and (4) below are satisfied:

$$-0.07 < f/(v2 \cdot f2) + f/(vd13 \cdot fd13) < -0.02; \tag{3}$$

$$0.0 < f/fd13 < 0.1; \tag{4}$$

where
f: focal length of an overall optical system of the imaging lens;
f2: focal length of the second lens;
fd13: focal length of the first diffraction optical surface;
v2: Abbe number of the second lens at d-rays; and
vd13: Abbe number of the first diffraction optical surface at d-ray.

3. The imaging lens according to claim 1,
wherein a conditional expression (7) below is satisfied:

$$0.6 < TTL/2ih < 0.9; \tag{7}$$

where
TTL: distance on the optical axis from an object-side surface of an optical element located nearest to an object to an image plane without a filter, etc.; and
ih: maximum image height.

4. The imaging lens according to claim 1,
wherein a conditional expression (8) below is satisfied:

$$0.5 < f1/f < 0.8; \tag{8}$$

where
f: focal length of an overall optical system of the imaging lens; and
f1: focal length of the first lens.

5. The imaging lens according to claim 1,
wherein a conditional expression (9) below is satisfied:

$$-1.50 < f2/f < -0.85; \tag{9}$$

where
f: focal length of an overall optical system of the imaging lens; and
f2: focal length of the second lens.

6. The imaging lens according to claim 1,
wherein a conditional expression (10) below is satisfied:

$$0.3 < f3/f < 0.6 \tag{10}$$

where
f: focal length of an overall optical system of the imaging lens; and
f3: focal length of the third lens.

7. The imaging lens according to claim 1,
wherein a conditional expression (11) below is satisfied:

$$-0.6 < f4/f < -0.3 \tag{11}$$

where
f: focal length of an overall optical system of the imaging lens; and
f4: focal length of the fourth lens.

8. The imaging lens according to claim 1,
wherein an aperture stop is disposed on the object side of the first lens, or between the first lens and the second lens, or between the second lens and the third lens.

* * * * *